United States Patent
Murakami et al.

(10) Patent No.: US 11,536,981 B2
(45) Date of Patent: Dec. 27, 2022

(54) DIFFRACTIVE OPTICAL ELEMENT, PROJECTION DEVICE, AND MEASUREMENT DEVICE

(71) Applicant: AGC INC., Tokyo (JP)

(72) Inventors: Ryota Murakami, Fukushima (JP); Motoshi Nakayama, Fukushima (JP)

(73) Assignee: AGC INC., Tokyo (JP)

( * ) Notice: Subject to any disclaimer, the term of this patent is extended or adjusted under 35 U.S.C. 154(b) by 198 days.

(21) Appl. No.: 17/114,985

(22) Filed: Dec. 8, 2020

(65) Prior Publication Data

US 2021/0088802 A1 Mar. 25, 2021

Related U.S. Application Data

(63) Continuation of application No. PCT/JP2019/022570, filed on Jun. 6, 2019.

(30) Foreign Application Priority Data

Jun. 11, 2018 (JP) .............................. JP2018-110909

(51) Int. Cl.
*G02B 5/18* (2006.01)
*G02B 27/42* (2006.01)
(Continued)

(52) U.S. Cl.
CPC ...... *G02B 27/4222* (2013.01); *G01B 11/2513* (2013.01); *G02B 27/44* (2013.01)

(58) Field of Classification Search
CPC ...... G02B 27/4222; G02B 27/44; G02B 1/11; G02B 1/111; G02B 1/113; G02B 1/115;
(Continued)

(56) References Cited

U.S. PATENT DOCUMENTS

2008/0106746 A1 5/2008 Shpunt et al.
2009/0096783 A1 4/2009 Shpunt et al.
(Continued)

FOREIGN PATENT DOCUMENTS

JP 2008102488 A * 5/2008 ................ G01J 3/02
JP 5174684 B2 4/2013
(Continued)

OTHER PUBLICATIONS

International Search Report dated Sep. 10, 2019 in PCT/JP2019/022570 filed Jun. 6, 2019, 2 pages.

*Primary Examiner* — Arnel C Lavarias
(74) *Attorney, Agent, or Firm* — Oblon, McClelland, Maier & Neustadt, L.L.P.

(57) ABSTRACT

A diffractive optical element includes: a substrate; a protrusion and recess portion that is formed on one surface of the substrate and imposes predetermined diffraction on incident light; and an antireflection layer provided between the substrate and the protrusion and recess portion. An effective refractive index difference Δn in a wavelength range of the incident light between a first medium constituting a protrusion of the protrusion and recess portion and a second medium constituting a recess of the protrusion and recess portion is 0.70 or more. An exit angle range $\theta_{out}$ of diffraction light exiting from the protrusion and recess portion when the incident light enters the substrate from a normal direction of the substrate is 60° or more. Total efficiency of diffraction light exiting from the protrusion and recess portion in the exit angle range is 65% or more.

16 Claims, 13 Drawing Sheets

(51) Int. Cl.
*G01B 11/25* (2006.01)
*G02B 27/44* (2006.01)

(58) Field of Classification Search
CPC .............. G02B 5/18; G02B 5/1866; G02B 2005/1804; G02B 27/42; G02B 27/4233; G02B 27/425; G02B 27/4266; G02B 27/4288; G02B 27/4294; G01B 11/2513; G01B 11/25
USPC ............... 359/558, 566, 569, 574, 575, 576
See application file for complete search history.

(56) References Cited

U.S. PATENT DOCUMENTS

| | | |
|---|---|---|
| 2009/0185274 A1 | 7/2009 | Shpunt |
| 2010/0177164 A1 | 7/2010 | Zalevsky et al. |
| 2010/0284082 A1 | 11/2010 | Shpunt et al. |
| 2011/0069389 A1 | 3/2011 | Shpunt |
| 2011/0075259 A1 | 3/2011 | Shpunt |
| 2011/0096182 A1 | 4/2011 | Cohen et al. |
| 2011/0158508 A1 | 6/2011 | Shpunt et al. |
| 2011/0279818 A1* | 11/2011 | Amako .............. G01J 3/44 430/321 |
| 2012/0105855 A1 | 5/2012 | Miyasaka et al. |
| 2012/0281240 A1 | 11/2012 | Cohen et al. |
| 2013/0120841 A1 | 5/2013 | Shpunt et al. |
| 2013/0136305 A1 | 5/2013 | Shpunt et al. |
| 2013/0155195 A1 | 6/2013 | Zalevsky et al. |
| 2015/0287205 A1 | 10/2015 | Zalevsky et al. |
| 2016/0100155 A1 | 4/2016 | Shpunt et al. |
| 2017/0004623 A1 | 1/2017 | Zalevsky et al. |
| 2017/0116757 A1 | 4/2017 | Shpunt et al. |
| 2017/0287923 A1 | 10/2017 | Zalevsky et al. |
| 2019/0319036 A1 | 10/2019 | Zalevsky et al. |

FOREIGN PATENT DOCUMENTS

| | | |
|---|---|---|
| JP | 2014-209237 A | 11/2014 |
| JP | 5760391 B2 | 8/2015 |

* cited by examiner

DIFFRACTIVE OPTICAL ELEMENT, PROJECTION DEVICE, AND MEASUREMENT DEVICE

TECHNICAL FIELD

The present invention relates to a diffractive optical element that generates light spots having a predetermined pattern, and a projection device and a measurement device that are equipped with the diffractive optical element.

BACKGROUND ART

There is a device that measures a position, a shape, etc. of a measurement target object by applying predetermined light to the measurement target object and detecting light scattered by the measurement target object (refer to Patent document 1, for example). In the kind of measurement device, a diffractive optical element can be used for applying a particular light pattern to a measurement target.

For example, there is a common diffractive optical element that is obtained by forming protrusions and recesses on a substrate surface. Diffractive optical elements having such a protrusion and recess structure diffract light by giving it a desired difference of optical path length utilizing a diffractive index difference between a material (e.g. air having a refractive index of 1) that fills up the recesses and a material of the protrusions.

Another example of common diffractive optical elements has a configuration in which recesses are filled up with (more specifically, the recesses are filled up with and the top surfaces of protrusions are formed with) a refractive material which has a different refractive index from that of a material of the protrusions and which is not air. Since the surfaces of the protrusions and the recesses are not exposed, this configuration can reduce a variation of diffraction efficiency caused by adhesion of substances. For example, Patent Literature 2 discloses a diffractive optical element in which another transparent material having a different refractive index is provided so as to fill up a protrusion and recess pattern for generating two-dimensional light spots.

Some optical devices use invisible light such as near infrared light. Examples of them include a remote sensing device that is used for face authentication and focusing of a camera device in smartphones etc., a remote sensing device that is connected to a game machine and used for detecting motion of a user, and a LIDAR (light detecting and ranging) device that is used in vehicles etc. to detect a nearby object.

Some of the above optical devices are required to apply light so that its emission angle is much different from a traveling direction of incident light. For example, in, for example, a use of focusing in a camera device that has a wide angle of view used in a smartphone or the like, and a use of detecting a nearby object such as an obstacle and a finger to be displayed on a display device in a device having a display screen suitable for a human viewing angle such as a VR (virtual reality) headset, the application of light in a wide angular range of 60° or more, 100° or more, or 120° or more may be desired.

To allow light to exit in such a wide angular range utilizing a diffractive optical element, it is necessary to form a protrusion and recess structure at a small pitch. In particular, in the case of a protrusion and recess structure that provides a wide exit angle range for long-wavelength incident light such as near infrared light, the protrusions tend to be increased in height to obtain a desired difference of optical path length. The height of protrusions may read as the depth of recesses.

In the case where the pitch of the protrusion and recess portion of a diffractive optical element is made small or its height is increased, the aspect ratio (e.g., (height of protrusions)/(width of protrusions)) is increased accordingly. In the case where the aspect ratio is increased, the ratio of the area of the side surfaces (of the protrusions) of the protrusion and recess portion capable of serving as interfaces for light traveling through the protrusion and recess portion to the area of all surfaces is increased, which may increase the influence of reflection at the side surfaces of protrusions and so on such that undesired 0th-order light may be generated. Typically, irradiation of strong 0th-order light is considered to be undesirable from the viewpoint of safety of eyes.

As for techniques for reducing 0th-order light in diffractive optical elements, Patent Literature 3, for example, discloses a configuration in which two diffractive optical elements (DOEs) are provided. In the technique disclosed in Patent Literature 3, 0th-order light is reduced by a configuration in which 0th-order light generated by a first diffractive optical element is diffracted by a second diffractive optical element.

CITATION LIST

Patent Literature

Patent Literature 1: Japanese Patent No. 5,174,684
Patent Literature 2: Japanese Patent No. 5,760,391
Patent Literature 3: JP-A-2014-209237

SUMMARY OF INVENTION

Technical Problems

A method for enabling wide-range irradiation while reducing the generation of undesired 0th-order light would be increasing the difference of refractive index between a material (e.g., air having a refractive index 1) for filling up the recesses and a material of the protrusions. Since the height of the protrusions can be reduced by increasing the difference between the refractive indexes, generation of undesired 0th-order light can be reduced by reducing the influence of reflection at the side surfaces of the protrusions and so on.

However, the combination of materials that increases the difference of refractive index between the protrusions and the recesses has problems that the reflectivity is high at the interfaces between these materials (in particular, the material having a high refractive index) and other media (e.g., substrate and air) so that the efficiency of light utilization is lowered or stray light is generated. In the case of generating many light spots or measuring return light (e.g., scattering light) of light applied by generated light spots, for example in projection devices and measurement devices, these problems are not preferable because they make it difficult to obtain high accuracy.

An object of the present invention is therefore to provide a diffractive optical element that is high in the efficiency of light utilization and can apply light in a wide range while reducing the generation of undesired 0th-order light, and a projection device and a measurement device that are equipped with that diffractive optical element.

Solution to Problem

A diffractive optical element in the present invention, includes: a substrate; a protrusion and recess portion that is formed on one surface of the substrate and imposes predetermined diffraction on incident light; and an antireflection layer provided between the substrate and the protrusion and recess portion, in which: an effective refractive index difference Δn in a wavelength range of the incident light between a first medium constituting a protrusion of the protrusion and recess portion and a second medium constituting a recess of the protrusion and recess portion is 0.70 or more; an exit angle range $θ_{out}$ of diffraction light exiting from the protrusion and recess portion when the incident light enters the substrate from a normal direction of the substrate is 60° or more; and total efficiency of diffraction light exiting from the protrusion and recess portion in the exit angle range with respect to a quantity of entire light entering the protrusion and recess portion in the wavelength range of the incident light is 65% or more.

A projection device in the present invention, includes: a light source; and the diffractive optical element, in which a ratio of a light quantity of light irradiating a predetermined projection surface to a light quantity of light emitted from the light source is 50% or more.

A measurement device in the present invention, includes: a projection unit configured to emit inspection light; and a detection unit configured to detect scattering light generated as a result of irradiation of the inspection light emitted from the projection unit to a measurement target object, in which the projection device is provided as the projection unit.

Advantageous Effects of Invention

The invention can provide a diffractive optical element that is high in the efficiency of light utilization and can apply light in a wide range while reducing the generation of undesired 0th-order light, and a projection device and a measurement device that are equipped with that diffractive optical element.

DESCRIPTION OF EMBODIMENTS

Figure 1:
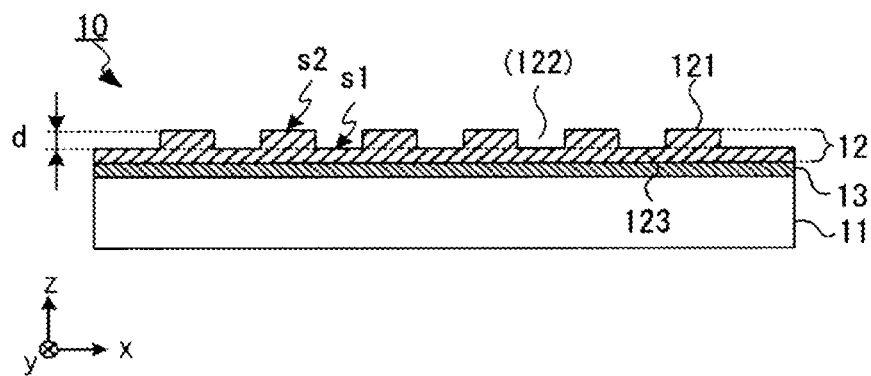
FIG. 1 is a schematic sectional view of a diffractive optical element 10 according to a first embodiment.

Embodiments of the present invention will be hereinafter described with reference to the drawings. FIG. 1 is a schematic sectional view of a diffractive optical element 10 according to a first embodiment. The diffractive optical element 10 is equipped with a substrate 11, a protrusion and recess portion 12 formed on one surface of the substrate 11, and an antireflection layer 13 provided between the substrate 11 and the protrusion and recess portion 12. In the following, the antireflection layer 13 which is provided between the substrate 11 and the protrusion and recess portion 12 will be referred to as an internal antireflection layer 13.

In the case where a light incidence direction is not explicitly shown in the embodiment, it is assumed that light travels in the +z direction or upward in the figure. The light traveling direction is not limited to those directions and may be in the −z direction or downward.

The substrate 11 is not particularly limited as long as the substrate 11 is a member that is transparent at used wavelength such as glass or a resin. The used wavelength means a wavelength range of light incident on the diffractive optical element 10. The following description will be made with an assumption that light in a particular wavelength range (e.g., 850±20 nm) within a wavelength range of visible light and near infrared light being 700 nm to 1,200 nm enters the diffractive optical element 10. However, the used wavelength is not limited to the wavelength range. In addition, unless otherwise mentioned, it is assumed that the visible wavelength range is 400 nm to 780 nm, the infrared wavelength range is 780 nm to 2,000 nm (near infrared range; in particular, 800 nm to 1,000 nm), and the ultraviolet wavelength range is 300 nm to 400 nm (near ultraviolet range; in particular 360 nm to 380 nm). The term "visible light" means light in the above visible range, the term "infrared light" means light in the above infrared range, and the term "ultraviolet range" means light in the above ultraviolet range.

The protrusion and recess portion 12 is a protrusion and recess structure having a protrusion and recess pattern that causes diffraction on incident light. More specifically, the protrusion and recess pattern is a two-dimensional pattern in a plan view of steps formed by protrusions 121 of the protrusion and recess portion 12. The term "plan view" used herein means a plan view as viewed from the traveling direction of light incident on the diffractive optical element 10 and corresponds to a plan view as viewed from the normal direction of the main surface of the diffractive optical element 10. The protrusion and recess pattern is formed so that light spots of plural respective diffraction light beams generated by the protrusion and recess pattern have a predetermined pattern on a predetermined projection surface or the like.

A protrusion and recess pattern that generates plural light spots to have a particular light pattern on a predetermined projection surface is obtained by, for example, applying Fourier-transformation to a phase distribution of light that exits from the protrusion and recess pattern.

In the embodiment, the downward direction is defined as the direction from the protrusion and recess portion 12 to the substrate 11 and the upward direction is the direction from the substrate 11 to the protrusion and recess portion 12. Thus, among the top surfaces of each step of the protrusion and recess portion 12, the surface that is closest to the substrate 11 is the bottommost surface and the surface that is most distant from the substrate 11 is the topmost surface.

In the following, in a protrusion and recess pattern (i.e., surfaces formed by the protrusion and recess portion 12 on the surface of the substrate 11 and having protrusions and recesses in a cross section) for causing a phase difference, portions that are located above lowest portions (first step s1 in the figure) will be referred to as protrusions 121 and portions that are recessed portions surrounded by the protrusions 121 and located below highest portions (in this example, second step s2) will be referred to as recesses 122. The height of portions, causing a phase difference actually, of the protrusion and recess portion 12, more specifically, the distance from the first step s1 of the protrusion and recess pattern to the topmost portions of the protrusions 121, will be referred to as a height d of the protrusions 121 or a grating depth d. Furthermore, in the following, a portion, not causing a phase difference, of the protrusion and recess portion 12 (in FIG. 1, the portion made of the same material as the bottommost portions of the protrusions 121, covers the surface of the substrate 11, and constitutes the first step s1) may be referred to as a base portion 123 (or underlying layer). The base portion 123 is located between the internal antireflection layer 13 and the protrusions 121 or recesses 122. However, the base portion 123 is not indispensable. That is, the base portion 123 may be either present or absent.

As for the number of steps of a protrusion and recess pattern, as in common diffraction gratings, each surface that constitutes steps for giving a phase difference to incident light is regarded as one step. FIG. 1 shows an example of a diffractive optical element 10 having a protrusion and recess portion 12 that constitutes a binary diffraction grating, that is, a two-step protrusion and recess pattern.

Figure 2A:
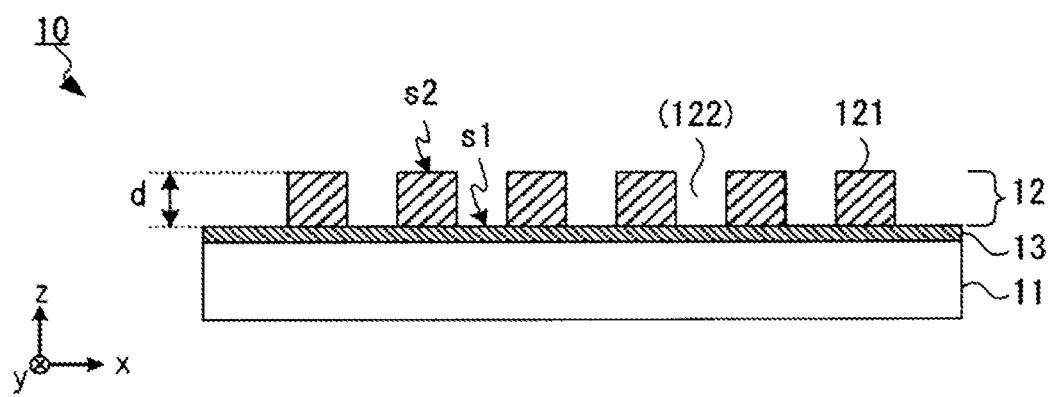
FIG. 2A to FIG. 2C are schematic sectional views showing other examples of diffractive optical elements 10.

FIG. 2A shows another example of diffractive optical elements 10. As shown in FIG. 2A, a diffractive optical element 10 can be configured in such a manner that a member other than a member constituting a protrusion and recess portion 12 (in this example, a member in an outermost layer of an internal antireflection layer 13, which will be described later) constitutes a first step of a protrusion and recess pattern. Also in this case, the height d of protrusions 121 is defined as the distance from the first step s1 of the protrusion and recess pattern to the topmost portions of the protrusions 121.

Figure 2B:
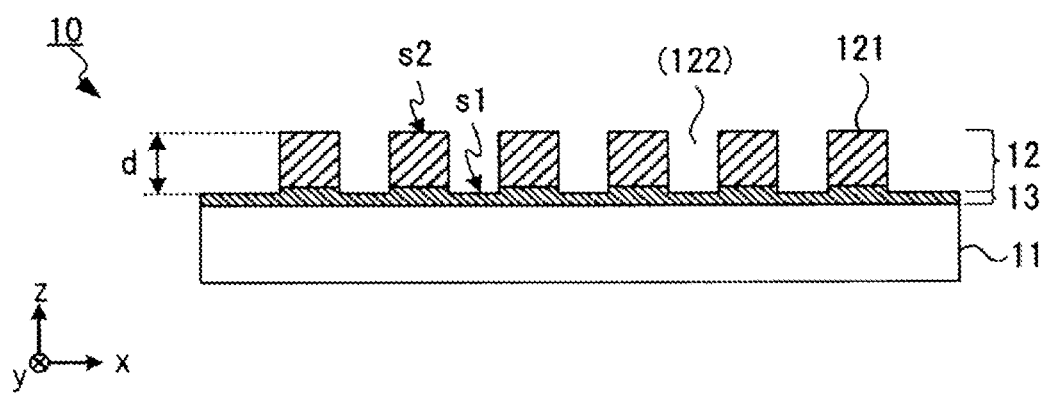

The configuration shown in FIG. 1 is a configuration in which the second medium (air) that fills up the recesses 122 is not in contact with the internal antireflection layer 13 at least in an effective region incident light enters. Alternatively, as shown in FIG. 2A and FIG. 2B, a configuration is possible in which the second medium (air) is in contact with the internal antireflection layer 13 at least in part of an effective region. In the latter case, the protrusion and recess portion 12 does not include a base portion 123. Both of FIG. 2A and FIG. 2B show an example diffractive optical element 10 that is equipped with a protrusion and recess portion 12 that constitutes a two-step protrusion and recess pattern and does not include a base portion 123. In this case, the second medium (air) constituting the recesses 122 is in contact with the internal antireflection layer 13 at least in part of an effective region.

In the example shown in FIG. 2A, the protrusion and recess portion 12 is formed on a flat internal antireflection layer 13. On the other hand, in the example shown in FIG. 2B, the protrusion and recess portion 12 is formed on an internal antireflection layer 13 having steps in the surface. In this case, in terms of function, portions made of the same material as a flat internal antireflection layer 13 (more specifically, bottommost layer) of the protrusions 121 may be regarded as being formed on the internal antireflection layer 13.

Figure 2C:
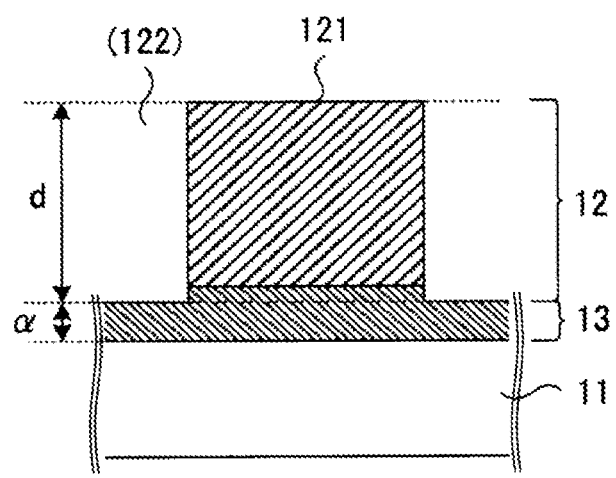

In this case, the height d of the protrusions 121 is defined so as to include the thickness of the portions located at the bottommost layer (see FIG. 2C). In this case, the internal antireflection layer 13 has different thickness in regions where it is in contact with the protrusions 121 and in regions where it is in contact with the recesses 122. However, there is no problem as long as the internal antireflection layer 13 is formed in each region in a configuration in which interface reflection between the internal antireflection layer 13 and the other medium in contact with the internal antireflection layer 13 can be reduced. For example, in the configuration shown in FIG. 2C, the internal antireflection layer 13 may have any configuration as long as interface reflection between the substrate 11 and the protrusions 121 in the regions where it is in contact with the protrusions 121 and interface reflection between the substrate 11 and the recesses 122 in the regions where it is in contact with the recesses 122 can be reduced. The requirements for the internal antireflection layer 13 are the same also in the case where the internal antireflection layer 13 has a constant thickness. For example, in the case where, as shown in FIG. 1, the protrusion and recess portion 12 includes the base portion 123, the internal antireflection layer 13 may have any configuration as long as interface reflection between the substrate 11 and the base portion 123 that are in contact with the internal antireflection layer 13. On the other hand, in the case where the internal antireflection layer 13 has different thickness in regions where it is in contact with the protrusions 121 and in regions where it is in contact with the recesses 122, if the difference is smaller than or equal to 2% of the height d of the protrusions 121, the portions, constituting the bottommost layer of the protrusions 121, of the internal antireflection layer 13 are not regarded as parts of the protrusions 121.

On the other hand, in the case where the portions (denoted by a in FIG. 2C) contributes to production of a phase difference by the protrusion and recess portion 12, a height and a refractive index (in this case, effective refractive index) of the protrusions 121 may be determined by regarding a part located above lowest portions (in a sense that the portions concerned are included) in the protrusion and recess pattern as the protrusions 121, according to the above-mentioned definition.

The material of the protrusion and recess portion 12 has a refractive index at used wavelength of 1.70 or more. Examples of such a material include inorganic materials that are oxides, nitrides, and oxynitrides of Zn, Al, Y, In, Cr, Si, Zr, Ce, Ta, W, Ti, Nd, Hf, Mg, La, Nb, and Bi, fluorides of Al, Y, Ce, Ca, Na, Nd, Ba, Mg, La, and Li, and silicon carbide and mixtures thereof. Transparent conductors such as ITO can also be used. Other examples thereof include Si, Ge, diamond-like carbon, and materials obtained by adding an impurity such as hydrogen to these materials. The material of the protrusion and recess portion 12 is not limited to inorganic materials as long as the refractive index at used wavelength satisfy the above-mentioned condition. Examples of materials that contain an organic material and have a refractive index of 1.70 or more include a thiourethane-based resin, an episulfide resin, polyimide, and what is called a nanocomposite material obtained by dispersing fine particles of an inorganic material in an organic material. Examples of fine particles of an inorganic material include oxides of Zr, Ti, Al, etc.

In the case where the recesses 122 are filled up with a medium other than air, the refractive index difference Δn between the protrusions 121 and the recesses 122 at used wavelength should be 0.70 or more. However, from the viewpoints of material selectivity and thinning, it is preferable that the recesses 122 be filled up with air.

Figure 3A:
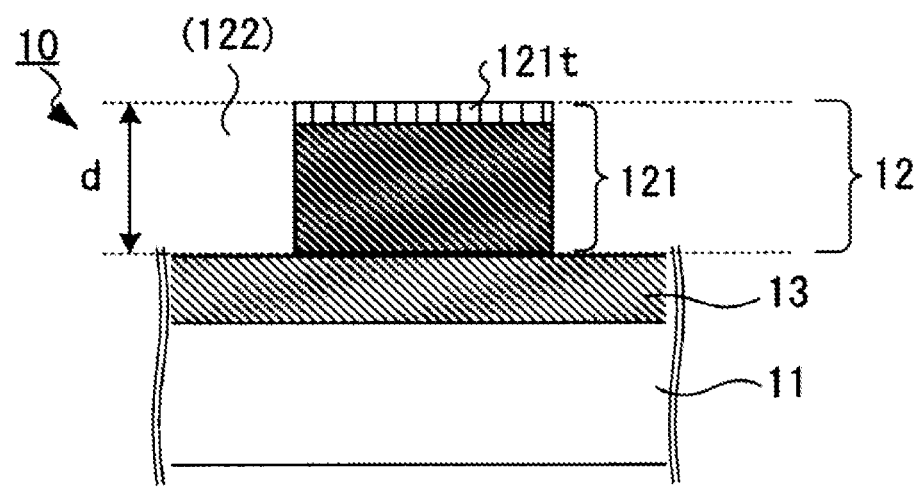
FIG. 3A to FIG. 3C are schematic sectional views showing other examples of diffractive optical elements 10.
Figure 3B:
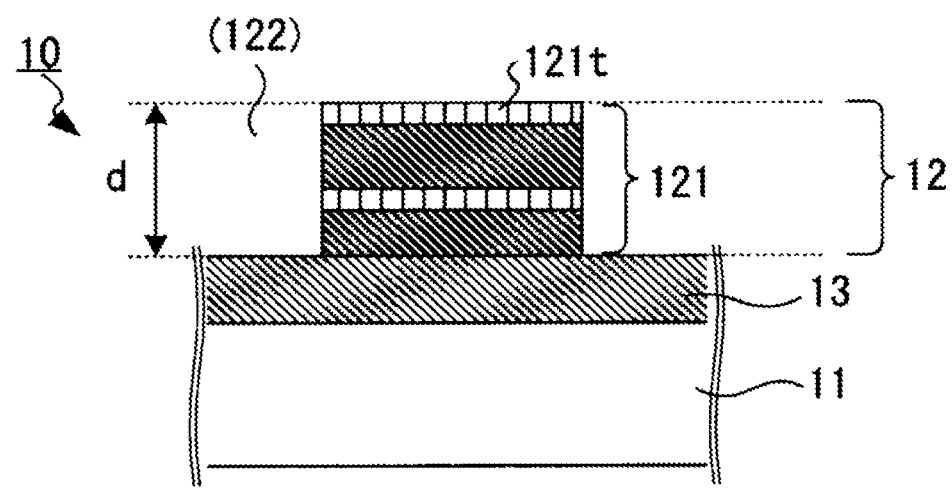
Figure 3C:
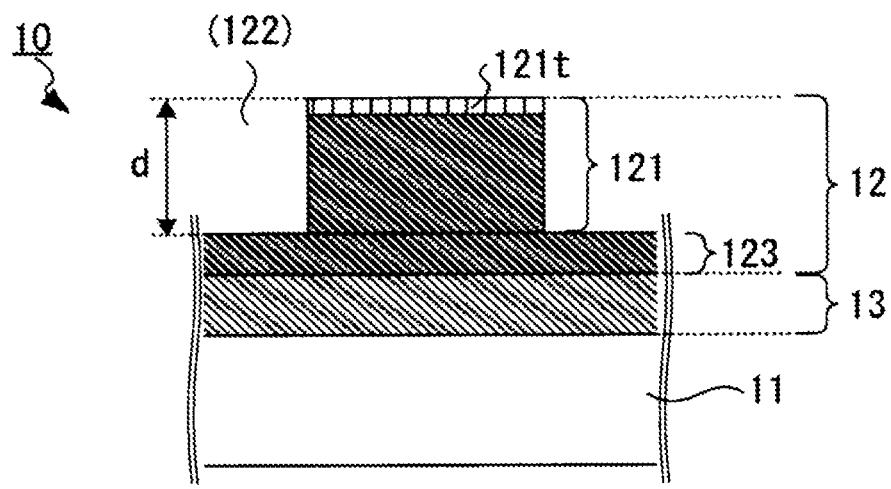

As shown in FIG. 3A to FIG. 3C, the protrusions 121 of the protrusion and recess portion 12 may have a multilayer structure. FIG. 3A shows an example in which each protrusion 121 is a multilayer film of two layers. FIG. 3B shows an example in which each protrusion 121 is a multilayer film of four layers. Although in the examples shown in FIG. 3A and FIG. 3B the protrusion and recess portion 12 does not include a base portion 123, as shown in FIG. 3C the protrusion and recess portion 12 may be formed so as to include a base portion 123 and at least each protrusion 121 is a multilayer film. In this case, the bottommost layer of each protrusion 121 and the base portion 123 may either be made of the same material or not.

As shown in FIG. 3A to FIG. 3C, it is more preferable that each protrusion 121 have a multilayer structure and its topmost layer 121t having a surface that is in contact with the air be made of a low-refractive index material whose refractive index is relatively low among the materials contained in the protrusion 121. For example, each protrusion 121 may be formed using, as a material, a multilayer film in which a low-refractive index material and a high-refractive index material are alternately layered. In this case, the total reflectance can be lowered further because, in addition to an effect of reducing the reflectance at the interfaces between the substrate 11 and the protrusion and recess portion 12 obtained by the internal antireflection layer 13, the reflectance at the interfaces between the protrusions 121 and the air can be reduced by forming the topmost layer 121t of each protrusion 121 using the low-refractive index material. The efficiency of light utilization can thus be increased further.

In the case where each protrusion 121 has a multilayer structure, the above-mentioned term "refractive index difference Δn" may read as a difference in terms of an effective refractive index ns described below (hereinafter referred to as an "effective refractive index difference"). In the embodiments, the effective refractive index difference of each protrusion 121 having a multilayer structure is defined as follows.

That is, the refractive index and the thickness of each layer (hereinafter referred to as a "grating layer") of the multilayer film constituting each protrusion 121 is respectively denoted by $ns_r$ and $ds_r$, and the effective refractive index given by the following formula (1) is denoted by ns, where r is the identifier of each grating layer and is an integer from 1 to the number layers. The denominator $\Sigma_r(ds_r)$ is the sum of each of the thickness of grating layers, which corresponds to the height d of each protrusion 121.

$$\text{(Effective refractive index } ns) = \Sigma_r(ns_r \times ds_r)/\Sigma_r(ds_r) \tag{1}$$

Since a refractive index of each protrusion 121 having a single layer structure can also be calculated according to formula (1) by setting r to be 1, the "refractive index difference Δn" of the protrusion and recess portion 12 can read as the "effective refractive index difference Δn" without discriminating between single layer protrusions 121 and multilayer protrusions 121.

The number of materials of the multilayer film of each protrusion 121 is not limited to two. For example, each protrusion 121 may be formed by a multilayer film made of one or more materials whose refractive indexes are higher than the effective refractive index of the protrusion 121 and one or more materials whose refractive indexes are lower than the effective refractive index of the protrusion 121. In this case, the topmost layer 121t of each protrusion 121 should be made of a material whose refractive index is lower than the effective refractive index of the protrusion 121. In the following, in the multilayer film constituting each protrusion 121, the material whose refractive index is lower than the effective refractive index of the protrusion 121 may be referred to as a low-refractive index material and the material whose refractive index is higher than the effective refractive index of the protrusion 121 may be referred to as a high-refractive index material.

Next, the diffraction caused by the diffractive optical element 10 will be described using an example light pattern that is generated by a diffractive optical element 10 shown in FIG. 4. The diffractive optical element 10 is formed so that a diffraction light beam group 22 that exits correspondingly to an incident light beam 21 with the optical axis direction extending in the Z axis is distributed two-dimensionally. With the diffractive optical element 10, a group of light beams is distributed in an angular range from a minimum angle $\theta x_{min}$ (not shown) to a maximum angle $\theta x_{max}$ (not shown) on the X axis and in an angular range from a minimum angle $\theta y_{min}$ (not shown) to a maximum angle $\theta y_{max}$ (not shown) on the Y axis, where the X axis is defined as an axis that intersects the Z axis and is perpendicular to the Z axis and the Y axis is defined as an axis that is perpendicular to both of the X axis and the Z axis.

The X axis and Y axis are approximately parallel with the longer sides and the shorter sides of a light spot pattern, respectively. A range of irradiation with the diffraction light beam group 22 that is from the minimum angle $\theta x_{min}$ to the maximum angle $\theta x_{max}$ in the X-axis direction and in a range from the minimum angle $\theta y_{min}$ to the maximum angle $\theta y_{max}$ in the Y-axis direction approximately coincides with a light detection range of a photodetecting element used together with the diffractive optical element 10. In the light spot pattern of this example, straight lines each of which is parallel with the Y axis and passes through a light spot at which the angle in the X direction with respect to the Z axis is $\theta x_{max}$ are the above-mentioned shorter sides and straight lines each of which is parallel with the X axis and passes through a light spot at which the angle $\theta y_{max}$ in the Y direction with respect to the Z axis are the above-mentioned longer sides. In the following, the angle at the diffractive optical element 10 subtended by a diagonal line connecting the intersection of a shorter side and a longer side and another intersection diagonal to the former is denoted by $\theta_d$ and is referred to as a "diagonal angle." The diagonal angle $\theta_d$ (hereinafter referred to as a "diagonal viewing angle $\theta_d$") is set equal to an exit angle range $\theta_{out}$ of the diffractive optical element 10. The exit angle range $\theta_{out}$ is an angular range indicating an expanse of a light pattern that is formed by diffraction light that exits from the protrusion and recess portion 12 when incident light enters the substrate 11 from its normal direction. Instead of being set equal to the diagonal viewing angle $\theta_d$, the exit angle range $\theta_{out}$ of the diffractive optical element 10 may be set equal to, for example, a maximum value of an angle formed by two light beams included in the diffraction light beam group 22.

In the diffractive optical element 10, for example, the exit angle range $\theta_{out}$ when incident light enters the substrate 11 from the direction that is normal to its surface should be 60° or more, preferably 70° or more. For example, some camera devices installed in smartphones etc. have angles of view (full angles) being about 50° to 90°. Some LIDAR devices used for autonomous driving etc. have angles of view being about 30° to 70°. Furthermore, the human viewing angle is typically about 120°, and camera devices of VR headsets having angles of view 70° to 140° are realized. To apply the diffractive optical element 10 to those devices, the exit angle range $\theta_{out}$ of the diffractive optical element 10 may be set 100° or more, or 120° or more.

The number of light spots generated by the diffractive optical element 10 may be 4 or more, 9 or more, 100 or more, or 10,000 or more. Although there are no particular limitations on the upper limit of the number of light spots, the upper limit may be 10,000,000, for example.

Figure 4:
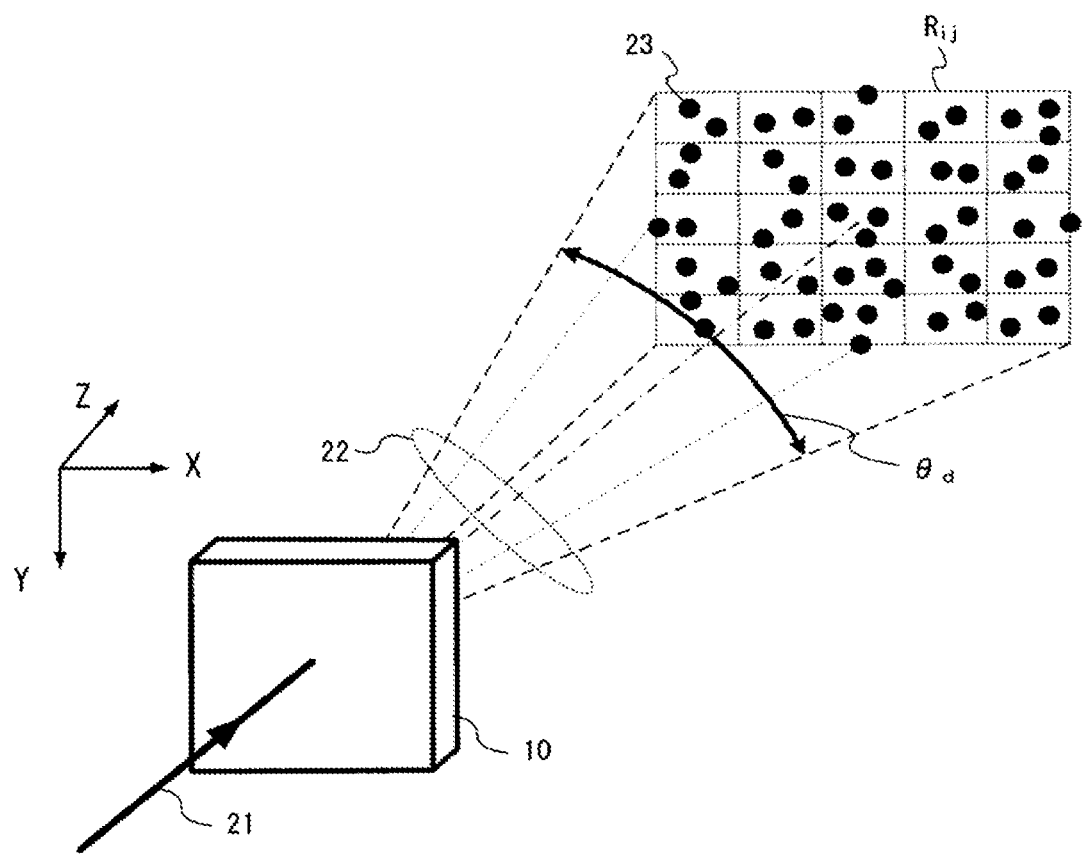
FIG. 4 is an explanatory diagram showing an example of light pattern generated by the diffractive optical element 10.

In FIG. 4, symbol $R_{ij}$ denotes divisional regions of the projection surface. For example, the diffractive optical element 10 may be configured so that where the projection surface is divided into the plural regions $R_{ij}$ a distribution density of light spots 23 of the light beam group 22 irradiating each region $R_{ij}$ is within ±50% of an average value over all of the regions. The distribution density may be within ±25% of an average value over all the regions. This configuration is suitable for a measurement purpose etc. because the distribution of light spots 23 in the projection surface can be made uniform. Here, the projection surface may be not only a flat surface but also a curved surface. Where the projection surface is a flat surface, it is not limited to a surface that is perpendicular to the optical axis of the optical system and may be a surface that is inclined with respect to the optical axis.

Each diffraction light beam included in the diffraction light beam group 22 shown in FIG. 4 is light that has been diffracted by an angle $\theta_{x0}$ in the X direction and an angle $\theta_{y0}$ in the Y direction with respect to the Z-axis direction as given by grating equations (2). In Equations (2), $m_x$ is the order of diffraction in the X direction, $m_y$ is the order of diffraction in the Y direction, $\lambda$ is the wavelength of a light beam 21, $P_x$ and $P_y$ are the pitches of the diffractive optical element in the X-axis direction and the Y-axis direction, respectively, and $\theta_{xi}$ and $\theta_{yi}$ are incident angles to the diffractive optical element in the X-axis direction and the Y-axis direction, respectively. When the diffraction light beam group 22 irradiates the projection surface of a screen, a measurement target object, or the like, plural light spots 23 are formed in an irradiated area.

$$\sin \theta_{xo} = \sin \theta_{xi} + m_x \lambda / P_x$$

$$\sin \theta_{yo} = \sin \theta_{yi} + m_y \lambda / P_y \qquad (2)$$

In the case where the protrusion and recess portion 12 has stepwise quasi-blazed shape having N steps, it is preferable that $\Delta n d/\lambda = (N-1)/N$ be satisfied because a wavefront in which an optical path length difference produced by the protrusion and recess portion 12 corresponds to one wavelength can be approximated, thereby achieving high diffraction efficiency. For example, in an example case that near infrared light enters a protrusion and recess pattern that is formed by protrusions 121 made of a material having a refractive index of 1.7 and recesses 122 constituted by air, the above relationship is $0.7 d/\lambda = (N-1)/N$. Thus, the height d of the protrusions 121 preferably satisfies $d = \{(N-1)/N\} \times \lambda/0.7$.

Figure 5A:
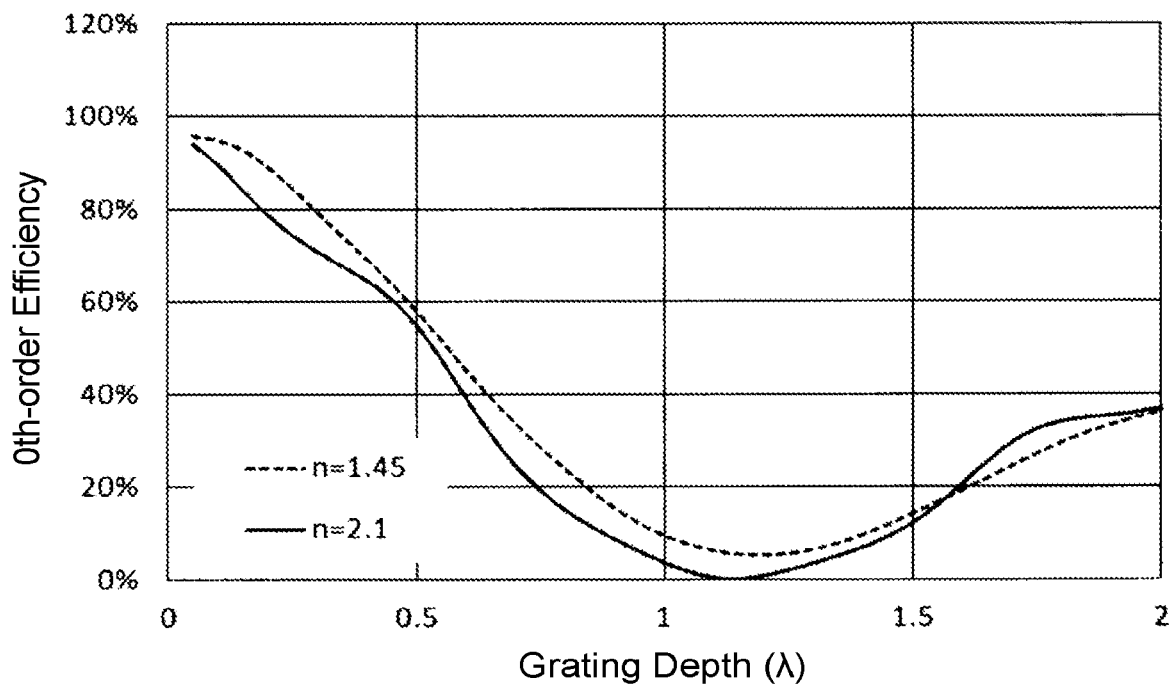
FIG. 5A and FIG. 5B are graphs showing a relationship between the grating depth d and the intensity of 0th-order light (0th-order efficiency).
Figure 5B:
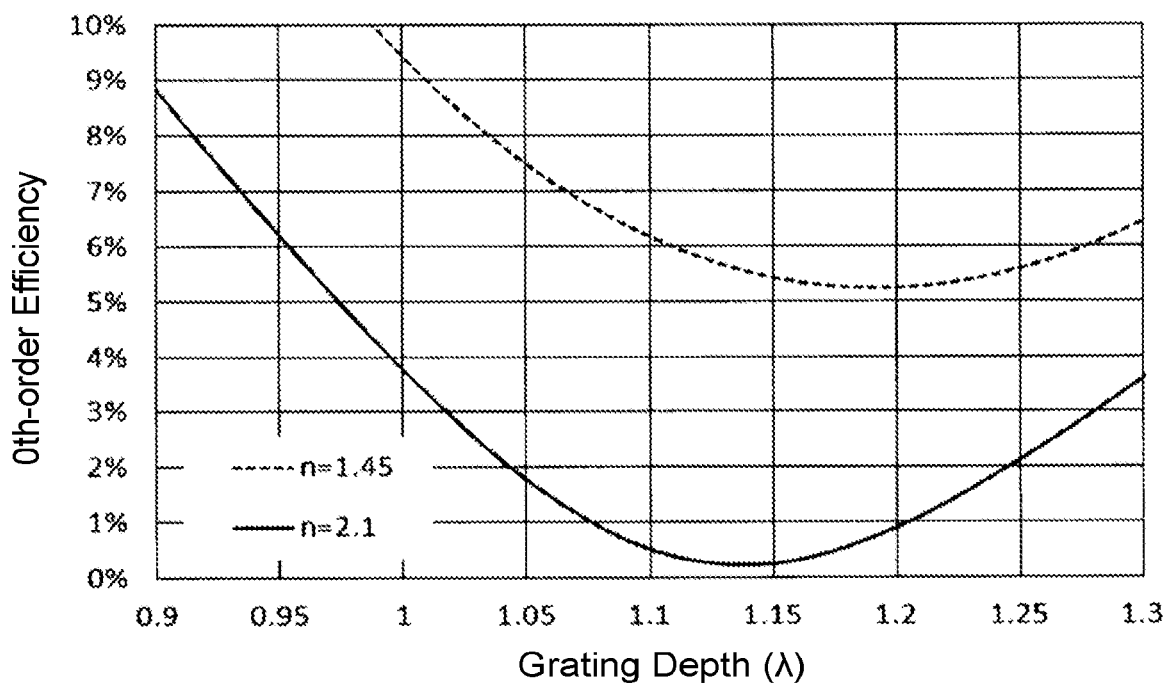

FIG. 5A and FIG. 5B are graphs showing relationships between the height (grating depth) d of the protrusions 121 and the intensity of 0th-order light (0th-order efficiency). Here, the 0th-order efficiency indicating the intensity of 0th-order light means the ratio of a light quantity of transmission 0th-order light that exits from the protrusion and recess portion 12 with respect to the quantity of entire light entering the protrusion and recess portion 12. FIG. 5A is a graph showing a relationship between the grating depth and the intensity of 0th-order light in the case where the grating depth is in a range of $0.05\lambda$ to $2.0\lambda$, and FIG. 5B is a graph that is an enlarged view of a part of FIG. 5A. FIG. 5A and FIG. 5B show design examples of cases that 441 light spots in total (21 points in the X direction and 21 points in the Y direction) are formed in a range in which a diagonal numerical aperture NA is 0.85 (NAs in the X direction and the Y direction are 0.6) and synthesized quartz (refractive index n: 1.45) or $Ta_2O_5$ (n: 2.1) is used as a material of the protrusions 121. In the embodiment, NA is an index that is given by $1 \cdot \sin(\theta_{out}/2)$.

As shown in FIG. 5A and FIG. 5B, in the case where the refractive index is 1.45, in design, the configuration that realizes the NA of 0.85 (exit angle range $\theta_{out}$: about 116°) cannot make the 0th-order efficiency lower than 5% no matter how the height d of the protrusions 121 is adjusted. On the other hand, in the case where the refractive index is 2.1, the 0th-order efficiency can be made, for example, 1% or less by adjusting the height d of the protrusions 121.

Figure 6:
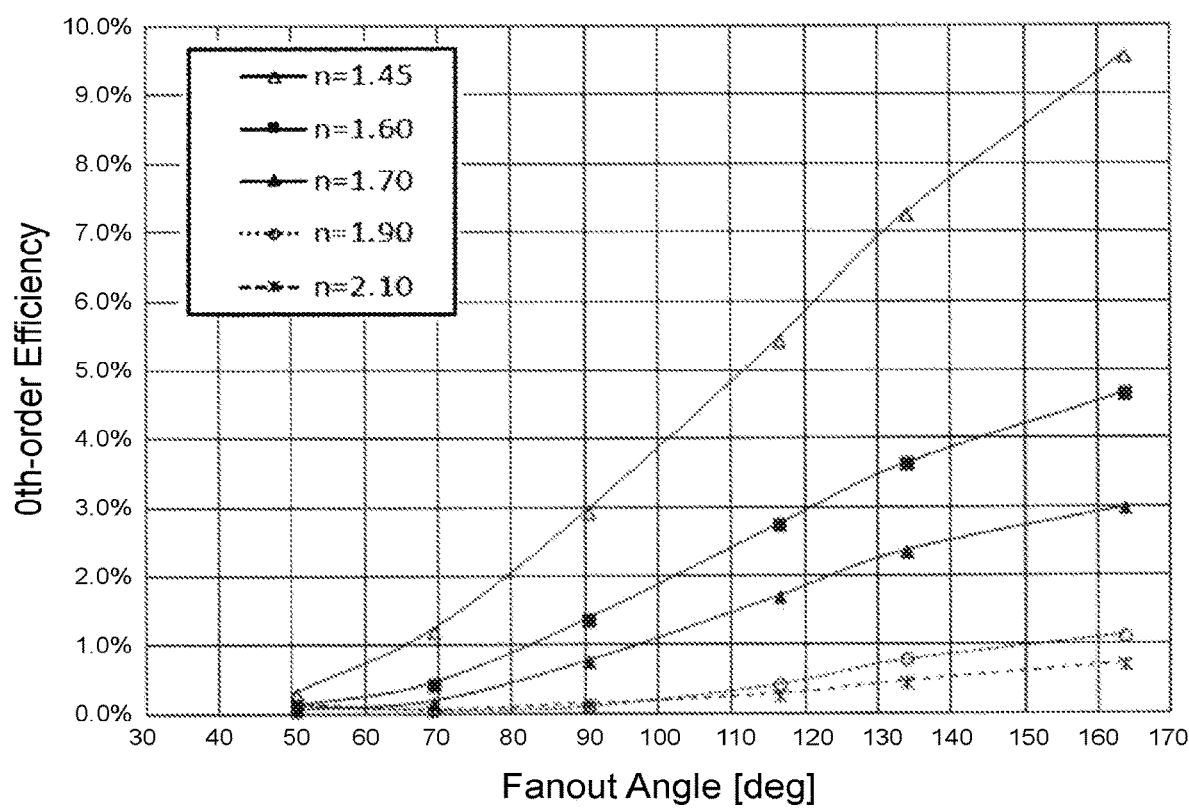
FIG. 6 is a graph showing relationships between the diagonal viewing angle $θ_d$ and the 0th-order efficiency (minimum value) for five materials having different refractive indexes.

In connection with the above, to lower the 0th-order efficiency while obtaining high diffraction efficiency for diffraction light of design orders other than the 0th order, a relationship of $\Delta n/NA \geq 0.7$ is preferably satisfied. Incidentally, $\Delta n/NA$ is preferably 0.7 or more, more preferably 1.0 or more. FIG. 6 is a graph showing relationships between the diagonal viewing angle $\theta_d$ and the 0th-order efficiency (minimum value) in cases where five materials having different refractive indexes are used as the material of the protrusions 121.

The five materials having different refractive indexes have refractive indexes of 1.45 (synthesized quartz), 1.60 (polycarbonate-based resin), 1.70 (SiON), 1.90 (HfO), and 2.10 ($Ta_2O_5$), respectively. FIG. 6 shows 0th-order efficiency (minimum values) calculated by a rigorous coupled-wave analysis (RCWA) for design solutions obtained for diagonal viewing angles $\theta_d$ of 50.2°, 68.8°, 90.0°, 116.0°, 133.4°, and 163.4°, respectively. FIG. 6 shows that the 0th-order efficiency lowers as the refractive index of the protrusions 121 increases. NAs corresponding to the above-mentioned diagonal viewing angles $\theta_d$ are 0.424, 0.565, 0.707, 0.848, 0.918, and 0.989, respectively.

Figure 7A:
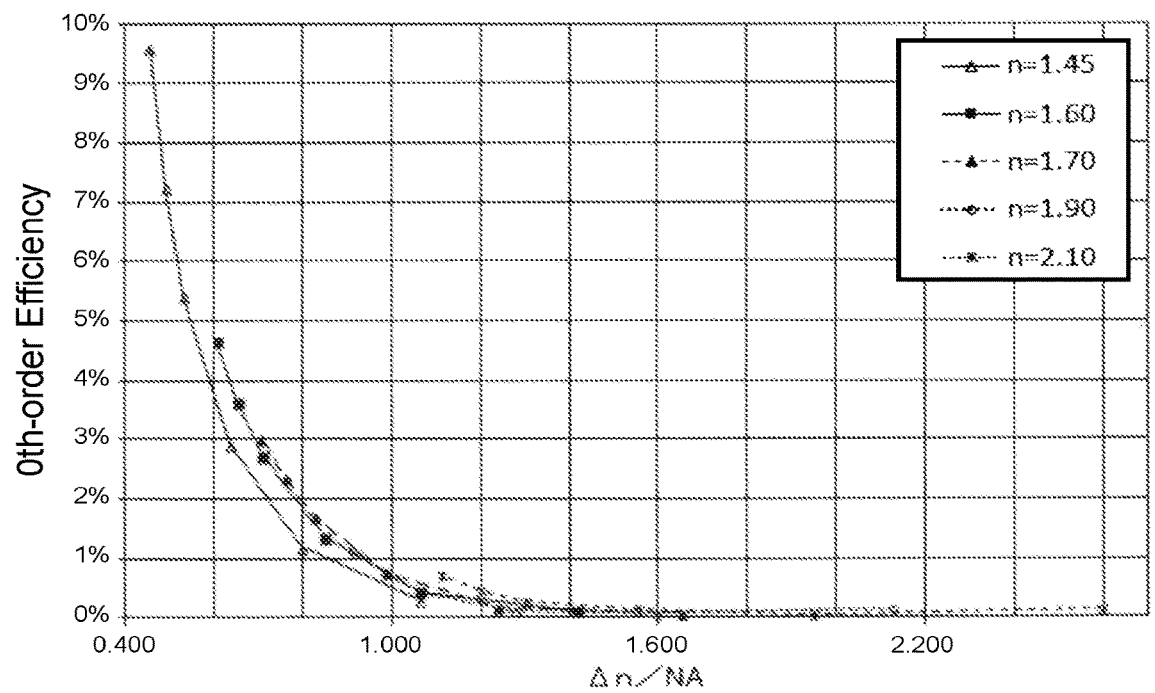
FIG. 7A and FIG. 7B are graphs showing a relationship between Δn/NA and the 0th-order efficiency (minimum value) for each of the five materials having different refractive indexes.
Figure 7B:
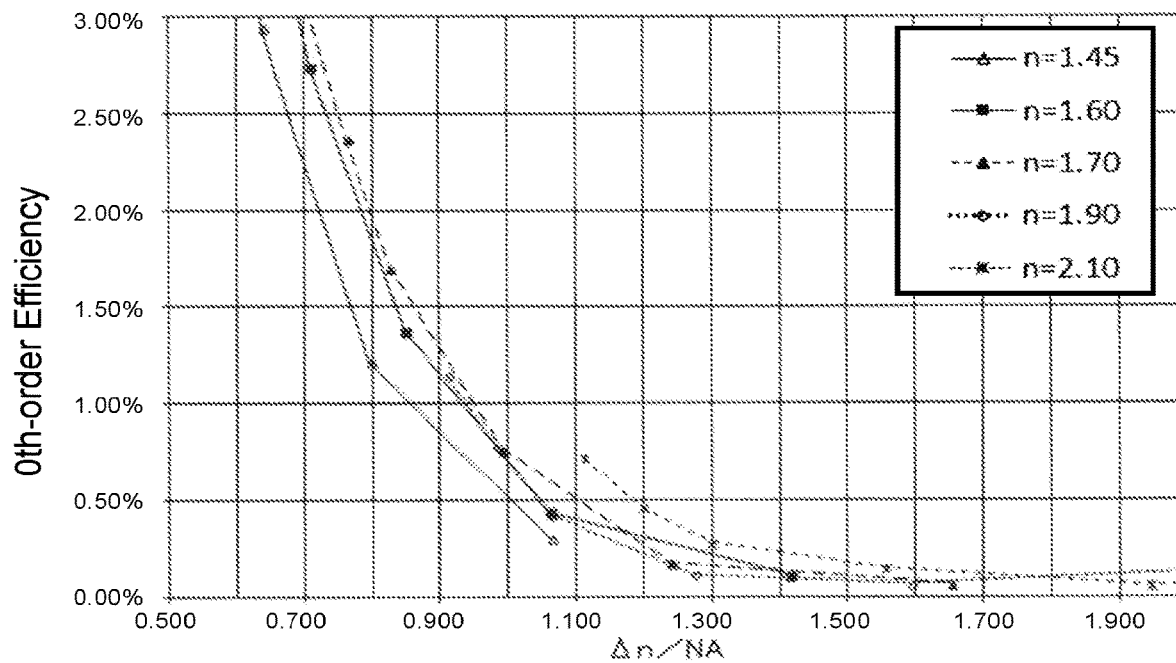

FIG. 7A and FIG. 7B shows a relationship between $\Delta n/NA$ and the 0th-order efficiency (minimum value) in each of the above-mentioned design solutions. FIG. 7A is a graph showing a full relationship of each of the above-mentioned design solutions, and FIG. 7B is a graph that is an enlarged view of a part of FIG. 7A.

In each of the above examples, the design wavelength is set at 850 nm and the recesses are assumed to be air (n=1). The protrusion and recess portion 12 has an 8-step protrusion and recess pattern that produces 441 light spots (21 points in the X direction and 21 points in the Y direction), and gratings of the protrusion and recess pattern are regularly arranged, and all separation angles of adjacent light spots are the same. Table 1 shows design parameter of each example.

The internal antireflection layer 13 is provided to prevent reflection at the interface between the substrate 11 and the protrusion and recess portion 12. There are no particular

TABLE 1

| No. | | Refractive index Protrusions (n) | Exit angle (full angle) (deg) | | | NA | $\Delta n d/\lambda$ | d (μm) | 0th-order efficiency (%) |
|---|---|---|---|---|---|---|---|---|---|
| | | | X direction | Y direction | Diagonal | | | | |
| 1 | 1 | 1.45 | 34.9 | 34.9 | 50.2 | 0.424 | 1.15 | 2.17 | 0.30 |
| | 2 | 1.45 | 47.1 | 47.1 | 68.8 | 0.565 | 1.15 | 2.17 | 1.22 |
| | 3 | 1.45 | 60.0 | 60.0 | 90.0 | 0.707 | 1.20 | 2.27 | 2.94 |
| | 4 | 1.45 | 73.7 | 73.7 | 116.0 | 0.848 | 1.20 | 2.27 | 5.44 |
| | 5 | 1.45 | 81.0 | 81.0 | 133.4 | 0.918 | 1.20 | 2.27 | 7.26 |
| | 6 | 1.45 | 88.8 | 88.8 | 163.4 | 0.989 | 1.20 | 2.27 | 9.60 |
| 2 | 1 | 1.60 | 34.9 | 34.9 | 50.2 | 0.424 | 1.15 | 1.63 | 0.12 |
| | 2 | 1.60 | 47.1 | 47.1 | 68.8 | 0.565 | 1.15 | 1.63 | 0.44 |
| | 3 | 1.60 | 60.0 | 60.0 | 90.0 | 0.707 | 1.15 | 1.63 | 1.37 |
| | 4 | 1.60 | 73.7 | 73.7 | 116.0 | 0.848 | 1.20 | 1.70 | 2.74 |
| | 5 | 1.60 | 81.0 | 81.0 | 133.4 | 0.918 | 1.20 | 1.70 | 3.63 |
| | 6 | 1.60 | 88.8 | 88.8 | 163.4 | 0.989 | 1.20 | 1.70 | 4.67 |
| 3 | 1 | 1.70 | 34.9 | 34.9 | 50.2 | 0.424 | 1.15 | 1.40 | 0.07 |
| | 2 | 1.70 | 47.1 | 47.1 | 68.8 | 0.565 | 1.15 | 1.40 | 0.18 |
| | 3 | 1.70 | 60.0 | 60.0 | 90.0 | 0.707 | 1.15 | 1.40 | 0.77 |
| | 4 | 1.70 | 73.7 | 73.7 | 116.0 | 0.848 | 1.15 | 1.40 | 1.71 |
| | 5 | 1.70 | 81.0 | 81.0 | 133.4 | 0.918 | 1.20 | 1.46 | 2.37 |
| | 6 | 1.70 | 88.8 | 88.8 | 163.4 | 0.989 | 1.20 | 1.46 | 3.00 |
| 4 | 1 | 1.90 | 34.9 | 34.9 | 50.2 | 0.424 | 1.10 | 1.04 | 0.15 |
| | 2 | 1.90 | 47.1 | 47.1 | 68.8 | 0.565 | 1.10 | 1.04 | 0.07 |
| | 3 | 1.90 | 60.0 | 60.0 | 90.0 | 0.707 | 1.15 | 1.09 | 0.12 |
| | 4 | 1.90 | 73.7 | 73.7 | 116.0 | 0.848 | 1.15 | 1.09 | 0.43 |
| | 5 | 1.90 | 81.0 | 81.0 | 133.4 | 0.918 | 1.15 | 1.09 | 0.79 |
| | 6 | 1.90 | 88.8 | 88.8 | 163.4 | 0.989 | 1.20 | 1.13 | 1.15 |
| 5 | 1 | 2.10 | 34.9 | 34.9 | 50.2 | 0.424 | 1.10 | 0.85 | 0.14 |
| | 2 | 2.10 | 47.1 | 47.1 | 68.8 | 0.565 | 1.10 | 0.85 | 0.06 |
| | 3 | 2.10 | 60.0 | 60.0 | 90.0 | 0.707 | 1.15 | 0.89 | 0.15 |
| | 4 | 2.10 | 73.7 | 73.7 | 116.0 | 0.848 | 1.15 | 0.89 | 0.28 |
| | 5 | 2.10 | 81.0 | 81.0 | 133.4 | 0.918 | 1.15 | 0.89 | 0.47 |
| | 6 | 2.10 | 88.8 | 88.8 | 163.4 | 0.989 | 1.15 | 0.89 | 0.72 |

As shown in FIG. 7A and FIG. 7B, as for the relationship between the 0th-order efficiency and $\Delta n/NA$, in the case where, for example, $\Delta n/NA$ is 0.7 or more, the minimum value of the 0th-order efficiency can be made smaller than 3.0% in all of design solutions in which the exit angle range $\theta_{out}$ is 70° or more (smaller than 165°). For example, in the case where $\Delta n/NA$ is 0.9 or more, the minimum value of the 0th-order efficiency can be made smaller than 1.5% in many of design solutions in which the exit angle range $\theta_{out}$ is larger than or equal to 100° (smaller than 165°). For another example, in the case where $\Delta n/NA$ is 1.0 or more, the minimum value of the 0th-order efficiency can be made smaller than 1.0% in many of design solutions in which the exit angle range $\theta_{out}$ is smaller than 165°. For a further example, where $\Delta n/NA$ is 1.2 or more, the minimum value of the 0th-order efficiency can be made smaller than 0.5% in many of design solutions in which the exit angle range $\theta_{out}$ is smaller than 140°. Among the design solutions shown in FIG. 5A to FIG. 7B, the ones in which n is 1.45 or 1.60 are comparative examples. In the diffractive optical element 10 according to the embodiment, it is preferable that the 0th-order efficiency (the ratio of a light quantity of 0th-order transmission light with respect to an incident light quantity) which is diffraction efficiency of 0th-order transmission light that exits from the diffractive optical element 10 when incident light enters the diffractive optical element 10 vertically (from the normal direction of the substrate 11) be lower than 3.0%, even preferably lower than 1.5%, further preferably lower than 1.0%, particularly preferably lower than 0.5%, and most preferably lower than 0.3%.

limitations on the internal antireflection layer 13 except that the internal antireflection layer 13 should have an antireflection function for lowering the reflectance of at least light having the design wavelength at the interface between the substrate 11 and the protrusion and recess portion 12. Examples of the internal antireflection layer 13 include a thin film having a single layer structure and multilayer films such as a dielectric multilayer film.

For example, in the case where the internal antireflection layer 13 is a single-layer thin film, it is even preferable that it satisfy the following condition relationship (3). In relationship (3), $n_r$ and $d_r$ are the refractive index and the thickness of the material of the internal antireflection layer, respectively, $n_m$ is the refractive index of the medium that shares the incidence-side interface with the internal antireflection layer, and no is the refractive index of the medium that forms the exit side interface with the internal antireflection layer. Due to the feature, the reflectance at the interfaces can be reduced. Here, in relationship (3), $\alpha$ and $\beta$ are 0.25 and 0.6, respectively. In the following, the condition relationship (3) may be referred to as a "first refractive index relationship relating to a single-layer thin film." It is even preferable that a be 0.2, further preferably 0.1. It is even preferable that $\beta$ be 0.4.

$$(n_0 \times n_m)^{0.5} - \alpha < n_r < (n_0 \times n_m)^{0.5} + \alpha; \text{ and}$$

$$(1-\beta) \times \lambda/4 < n_r \times d_r < (1+\beta) \times \lambda/4 \quad (3)$$

In the case where the internal antireflection layer 13 is a multilayer film, the reflectance R that is given by the following formula (4) is preferably lower than 1%, even preferably 0.5% or less, for light having the design wavelength.

For the internal antireflection layer 13 being a multilayer film, it is assumed that light enters the multilayer film at an incident angle $\theta_0$ from a medium M1 that is located on the incidence side of the multilayer film and has a refractive index $n_0$, then passes through a q-layer multilayer film M2 in which each layer has a refractive index $n_r$ and a thickness $d_r$, and enters a medium M3 that is located on the exit side of the multilayer film and has a refractive index $n_m$. In this case, a reflectance can be calculated according to formula (4), where $\eta_0$, $\eta_m$, and $\eta_r$ are the effective refractive indexes of the media M1, M2, and M3, respectively, in which oblique incidence is taken into consideration.

[Math 1]

$$R = \left(\frac{\eta_0 - Y}{\eta_0 + Y}\right)\left(\frac{\eta_0 - Y}{\eta_0 + Y}\right)^* \quad (4)$$

where $$\begin{pmatrix} B \\ C \end{pmatrix} = \left\{\prod_{r=1}^{q} \begin{bmatrix} \cos\delta_r & (i\sin\delta_r)/\eta_r \\ i\eta_r\sin\delta_r & \cos\delta_r \end{bmatrix}\right\}\begin{bmatrix} 1 \\ \eta_m \end{bmatrix}$$

$Y = C/B$ $\eta_0 = \frac{n_0}{\cos\theta_0}$ (p-polarized light), $\eta_0 = n_0 * \cos\theta_0$ (s-polarized light)

$\eta_m = \frac{n_m}{\cos\theta_m}$ (p-polarized light), $\eta_m = n_m * \cos\theta_m$ (s-polarized light)

$\eta_r = \frac{n_r}{\cos\theta_r}$ (p-polarized light), $\eta_r = n_r * \cos\theta_r$ (s-polarized light)

$\delta_r = 2\pi n_r d_r \cos\theta_r / \lambda$ $n_0 * \sin\theta_o = n_m * \sin\theta_m = n_r * \sin\theta_r$ Thus, in the case where the internal antireflection layer 13 is not formed, Y is equal to $\eta_m$ and relatively strong reflection occurs. In contrast, the reflection can be reduced in the case where Y is made closer $\eta_0$ by the internal antireflection layer 13. In particular, in the case of perpendicular incidence, $\eta_0$, $\eta_m$, and $\eta_r$ are equivalent to refractive indexes. In the following, the reflectance R that is given by formula (4) may be referred to as a "theoretical reflectance of a multilayer structure."

Although the member that constitutes the protrusions 121 of the protrusion and recess portion 12 is typically a thin film and a calculation needs to be performed by regarding it as part of a multilayer film as described above, in the case where the internal antireflection layer 13 is formed as described above, the reflectance can be lowered without dependence on the thickness of the thin film constituting the protrusions 121 of the protrusion and recess portion 12. An interference effect may be taken into consideration by applying formula (4) in which q=1 to a single-layer internal antireflection layer 13.

In the case where light (wavelength: $\lambda$ (nm)) enters the internal antireflection layer 13 obliquely, it is preferable that the following condition be satisfied for perpendicular light incidence. That is, it is preferable that a local minimum value of a transmittance spectrum in a range of $\lambda$−200 nm to $\lambda$+200 nm exist in a range of $\lambda$ to $\lambda$+200 nm. It is even preferable that a local minimum value exist in a range of $\lambda$ to $\lambda$+100 nm. This is because in the case of oblique light incidence, the transmittance spectrum is shifted to the shorter wavelength side. In the above configuration, transmittance reduction at the interfaces of the internal antireflection layer 13 due to oblique incidence can be prevented. Incidentally, $\lambda$ corresponds to "design wavelength."

Figure 8:
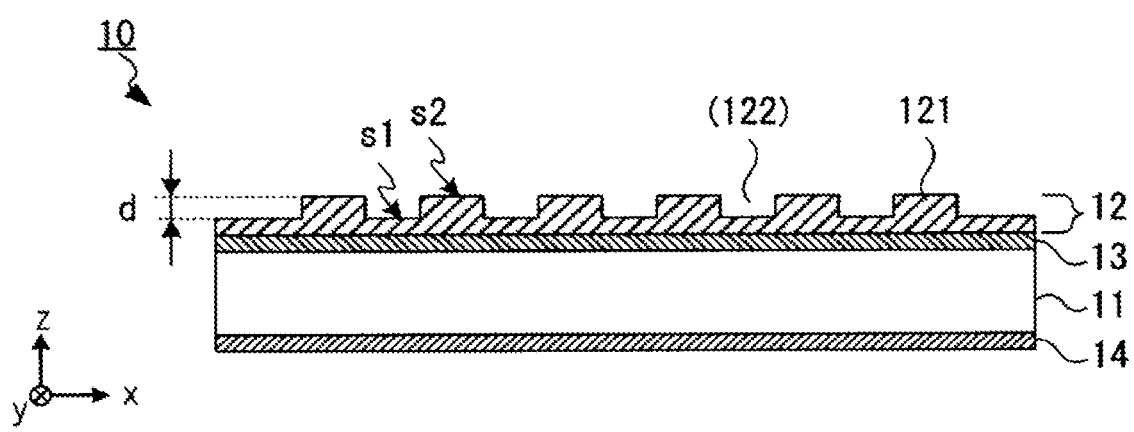
FIG. 8 is a schematic sectional view showing another example of diffractive optical element 10.

As shown in FIG. 8, the diffractive optical element 10 may further be provided with an antireflection layer 14 on the surface of the substrate 11 opposite to its surface on which the protrusion and recess portion 12 is formed.

The antireflection layer 14 is provided to prevent reflection at the exit side interface of the diffractive optical element 10. There are no particular limitations on the antireflection layer 14 except that the antireflection layer 14 should have an antireflection function for lowering the reflectance of at least light having the design wavelength at the exit side interface of the diffractive optical element 10. Examples of the antireflection layer 14 include a thin film having a single-layer structure or multilayer films such as a dielectric multilayer film. The conditions related to reflectance for the internal antireflection layer 13 may be employed as they are as conditions related to reflectance for the antireflection layer 14.

In the case where light enters the diffractive optical element 10 from the side where the protrusion and recess portion 12 is provided (i.e., from the −z direction shown in figures), the internal antireflection layer 13 and the antireflection layer 14 preferably satisfy the above-described conditions related to reflectance for light having the design wavelength entering at an angle within $\theta_{out}/2$ with respect to the normal direction of the substrate 11. In the configuration, light diffracted by the protrusion and recess portion 12 enters the internal antireflection layer 13 and the antireflection layer 14. The internal antireflection layer 13 and the antireflection layer 14 may satisfy the above-described reflectance-related conditions for light being a particular polarization component having the design wavelength that enters at an angle within $\theta_{out}/2$ with respect to the normal direction of the substrate 11.

For example, the internal antireflection layer 13 and the antireflection layer 14 are formed so that the reflectance for at least light having the design wavelength and a particular polarization that enters at 40° or less with respect to the normal direction of the substrate 11 is 0.5% or lower. The internal antireflection layer 13 and the antireflection layer 14 may be formed so that the reflectance for at least particular polarized light in the wavelength range of incident light, exiting from the diffractive optical element 10 at an angle being ¼ of an exit angle range $\theta_{out}$, that is, ½ of a maximum exit angle (half angle), is 0.5% or less.

The internal antireflection layer 13 and the antireflection layer 14 may have, in addition to the antireflection function for light having the design wavelength, an antireflection function for light in a particular wavelength range excluding the design wavelength (e.g., ultraviolet light). In devices etc. to be provided with the diffractive optical element 10 may be equipped with an optical element other than the diffractive optical element 10. In the above configuration, the diffractive optical element 10 does not interrupt light to be used by such an optical element.

In this case, the internal antireflection layer 13 and the antireflection layer 14 may be formed so as to satisfy, in addition to the above-described conditions for light having the design wavelength, a condition that the reflectance for at least light having a wavelength of 360 nm to 370 nm and a particular polarization that enters at 20° or less with respect to the normal direction of the substrate 11 is 1.0% or lower.

The above-mentioned term "reflectance" may read as a reflectance for 0th-order light when light going straight (i.e., light traveling in the normal direction of the substrate 11) enters. In this case, this reflectance may be determined for each optical path (e.g., for an optical path passing through a protrusion and for an optical path passing through a recess) and for each interface with another medium. In this case, in the case where the protrusions 121 or a reflection layer has a multilayer film structure, a reflectance at the interface with the substrate 11 or the air may be determined regarding the multilayer film structure for such a desired function as one medium. In the embodiment, it is even preferable that, for example, the sum (total reflectance) of reflectances at the interfaces between the protrusion and recess portion 12 and the other media (substrate 11 and the air) satisfy the above-described conditions. Such a reflectance can be determined from a difference between a light quantity of straight light entering the protrusion and recess portion 12 from the side of the substrate 11 and a light quantity of straight light exiting the protrusion and recess portion 12 to the air layer.

In the above, a light quantity of transmission 0th-order light is calculated by RCWA. However, a light quantity of transmission 0th-order light can also be evaluated by causing collimated laser light having the design wavelength to enter the diffractive optical element 10 and measuring a light quantity of straight transmission light.

In each embodiment described above, there are no particular limitations on the wavelength of incident light. For example, the incident light may be infrared light (more specifically, light in a wavelength range of 780 nm to 1,020 nm). The diffractive optical element according to each embodiment is more effective in the case of handling light in longer wavelength range than visible light because the protrusions and recesses particularly tend to be increased in height to elongate the optical path length difference.

Since the diffractive optical element according to each embodiment is capable of diffusing light efficiently, the diffractive optical element can be used in projection devices such as a projector. The diffractive optical element according to each embodiment can be used as a diffusing element that is disposed between a light source and a predetermined projection surface and serves to project light emitted from the light source onto the predetermined projection surface. The diffractive optical element according to each embodiment can also be used in a light projection device that is included in a device for detecting light scattered by a target object irradiated with light such as a three-dimensional measurement device or an authentication device and serves to apply inspection light to a predetermined projection area. Furthermore, the diffractive optical element according to each embodiment can also be used in an intermediate screen (an optical element for generating an intermediate image) of a projection device such as a head-up display. In this case, for example, the diffractive optical element can also be used as an intermediate screen that is disposed between a light source for emitting light for forming an intermediate image and a combiner in the projection device and serves to project, onto the combiner, light emitted from the light source to form an intermediate image.

In each of the above devices, it is preferable that the ratio of the quantity of light irradiating the predetermined projection surface with respect to the quantity of light that is emitted from the light source is 50% or more, by virtue of the effect that the reflectance is lowered in the diffractive optical element. It is even preferable that the ratio (corresponding to a term "total efficiency" described later) of the quantity of diffraction light of a design order irradiating the predetermined projection surface with respect to the quantity of light that is emitted from the light source is 65% or more, further preferably 70% or more.

EXAMPLES

Example 1

This Example is a diffractive optical element 10 having a protrusion and recess portion 12 having a multilayer structure that constitutes a two-step protrusion and recess pattern and includes a base portion 123, like the example diffractive optical element 10 shown in FIG. 3C. However, in this Example, as shown in FIG. 8, an antireflection layer 14 is further provided on the surface of a substrate 11 opposite to its surface on which the protrusion and recess portion 12 is formed. The design wavelength is 850 nm and the recesses 122 are air (n=1).

In the diffractive optical element 10 of this Example, protrusion and recess patterns were designed so that the exit angle range $\theta_{out}$ (more specifically, diagonal viewing angle $\theta_d$) of a diffraction light group that exits the protrusion and recess portion 12 became equal to 50°, 68°, 90°, 102°, 116°, 134°, and 164°, respectively. The Examples whose $\theta_d$ is 50°, 68°, 90°, 102°, 116°, 134°, and 164° are Examples 1A, 1B, 1C, 1D, 1E, 1F, and 1G, respectively. However, Examples 1F and 1G are Referential Examples. In each Example, it was assumed that the grating of the protrusion and recess pattern was regularly arranged, and all pairs of adjacent light spots had the same separation angle.

In this Example, the material of the substrate 11 was a glass substrate having a refractive index of 1.514. The material of the protrusion and recess portion 12 was a two-layer multilayer film made of $Ta_2O_5$ having a refractive index of 2.192 and $SiO_2$ having a refractive index of 1.463. The material of the internal antireflection layer 13 was a four-layer dielectric multilayer film made of similar $SiO_2$ and $Ta_2O_5$. The material of the antireflection layer 14 was a six-layer dielectric multilayer film made of similar $SiO_2$ and $Ta_2O_5$. Table 2 shows specific configurations of Examples 1A to 1G of the diffractive optical element 10 of this Example. As shown in Table 2, in this Example, Examples 1A to 1G are the same in configuration except the structure of the protrusions 121.

TABLE 2

| | | Refractive | Thickness (nm) Example 1 | | | | | | |
|---|---|---|---|---|---|---|---|---|---|
| Configuration | Material(s) | index | A | B | C | D | E | F | G |
| Antireflection | SiO₂ | 1.463 | | | | 172 | | | |
| layer | Ta₂O₅ | 2.192 | | | | 67 | | | |
| | SiO₂ | 1.463 | | | | 42 | | | |
| | Ta₂O₅ | 2.192 | | | | 18 | | | |

TABLE 2-continued

| Configuration | | Material(s) | Refractive index | Thickness (nm) Example 1 | | | | | | |
|---|---|---|---|---|---|---|---|---|---|---|
| | | | | A | B | C | D | E | F | G |
| | | SiO$_2$ | 1.463 | | | | 35 | | | |
| | | Ta$_2$O$_5$ | 2.192 | | | | 18 | | | |
| Substrate | | Borosilicate glass | 1.514 | | | | — | | | |
| Internal antireflection layer | | Ta$_2$O$_5$ | 2.192 | | | | 19 | | | |
| | | SiO$_2$ | 1.463 | | | | 34 | | | |
| | | Ta$_2$O$_5$ | 2.192 | | | | 25 | | | |
| | | SiO$_2$ | 1.463 | | | | 26 | | | |
| Protrusion and recess portion | Base portion | Ta$_2$O$_5$ | 2.192 | | | | 200 | | | |
| | Protrusions | | | 348 | 354 | 354 | 354 | 361 | 361 | 361 |
| | | SiO$_2$ | 1.463 | 146 | 146 | 146 | 146 | 146 | 146 | 146 |

A manufacturing method of this Example is as follows. First, an antireflection layer 14 that is a six-layer dielectric multilayer film made of SiO$_2$ and Ta$_2$O$_5$ is formed on a glass substrate. The material and thickness of each layer are as shown in Table 2.

Then an internal antireflection layer 13 that is a four-layer dielectric multilayer film made of SiO$_2$ and Ta$_2$O$_5$ is formed on the surface of the glass substrate opposite to its surface on which the antireflection layer 14 has been formed. The material and thickness of each layer are as shown in Table 2. Then a two-layer dielectric multilayer film made of SiO$_2$ and Ta$_2$O$_5$ is formed at a predetermined film thickness as materials of a protrusion and recess portion 12 including a base portion 123. For example, in Example 1A, a Ta$_2$O$_5$ film having a film thickness of 548 nm is formed to be a bottommost layer of the base portion 123 and a grating layer of the protrusions 121 and an SiO$_2$ film having a film thickness 146 nm to be a topmost layer of the grating layer of the protrusions 121 are formed on the Ta$_2$O$_5$ film.

Subsequently, the thus-formed two-layer multilayer film made of SiO$_2$ and Ta$_2$O$_5$ are processed into a two-step protrusion and recess structure by photolithography and etching. The heights (grating depths) of the protrusions 121 of the respective Examples are 494 nm to 507 nm (the sums of the thicknesses of the protrusion materials shown in Table 2). A height d (film thickness) of the protrusions 121 can be measured by observation of a cross section using a step gauge or an SEM (scanning electron microscope). In this manner, diffractive optical elements 10 of Examples 1A-1G are obtained.

Figure 9A:
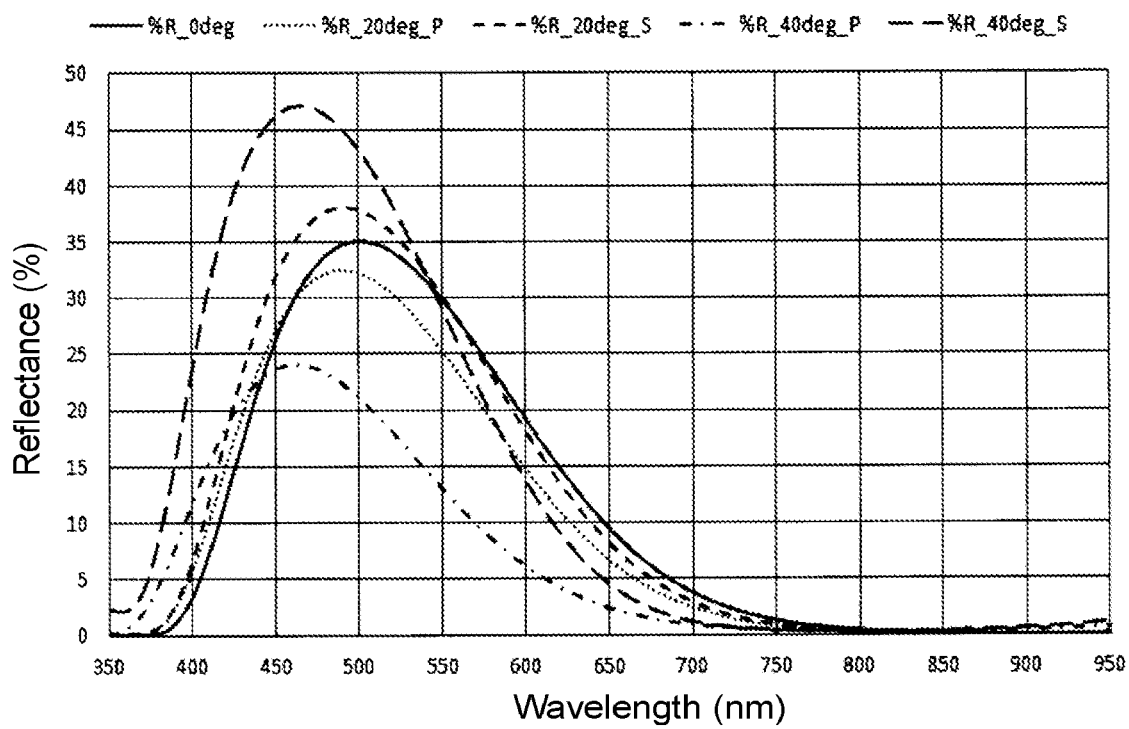
FIG. 9A and FIG. 9B are graphs showing calculation results of reflectance of diffractive optical elements 10 of Example 1.
Figure 9B:
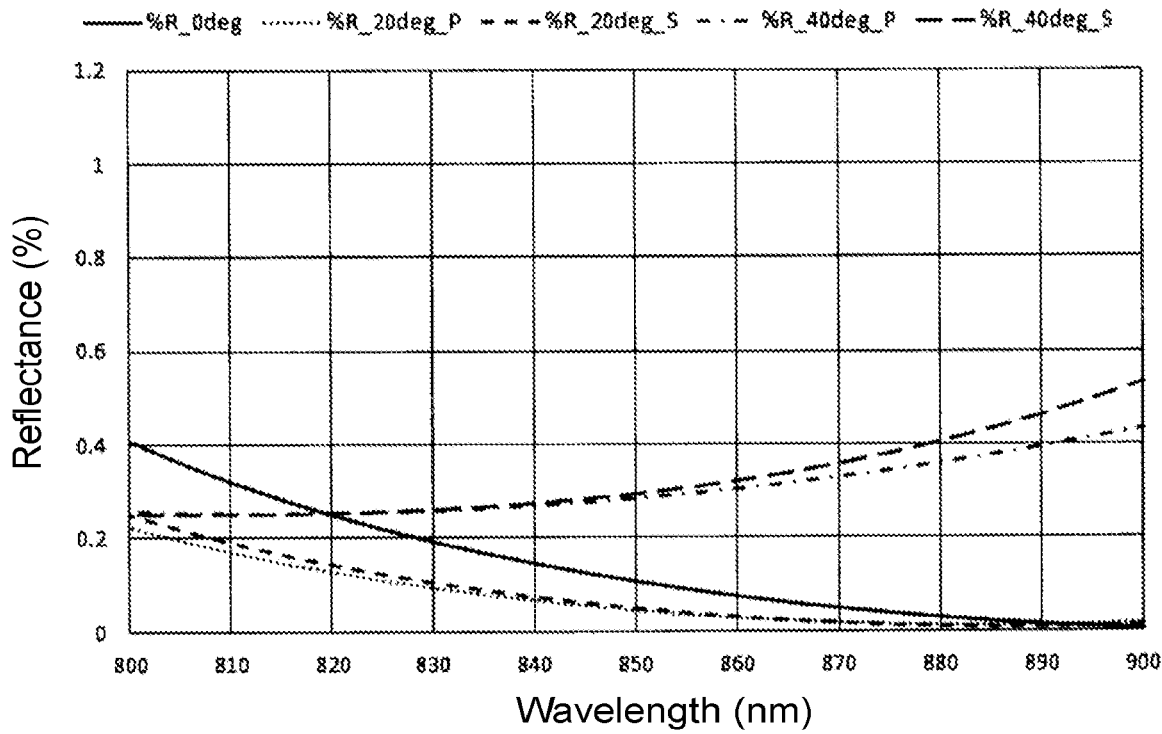

FIG. 9A and FIG. 9B show calculation results of reflectance of the antireflection layer 14 of this Example. FIG. 9A shows calculation results of reflectance in a wavelength range of 350 nm to 950 nm, and FIG. 9B shows calculation results of reflectance in part of the above wavelength range, that is, 800 nm to 900 nm. FIG. 9A and FIG. 9B show calculation results of cases where the incident angle, that is, the angle of incident light with respect to the normal direction of the substrate 11, is 0°, 20°, and 40°. In the case of oblique incidence, calculations were made for p-polarized light and s-polarized light.

Figure 10:
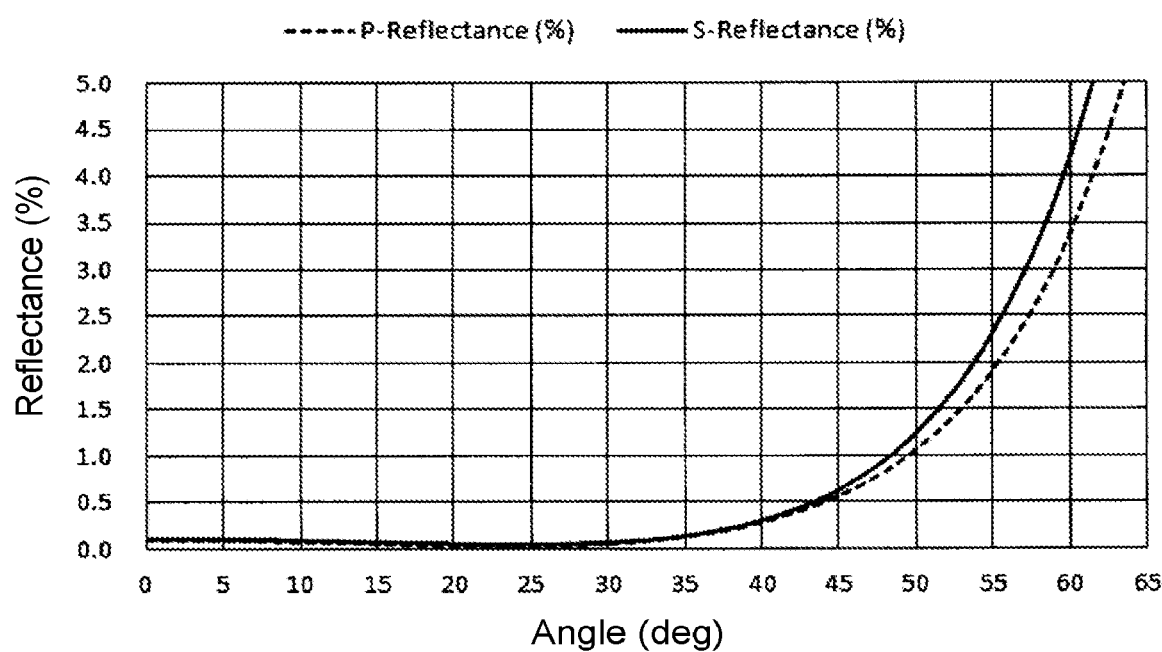
FIG. 10 is a graph showing incident angle dependence of the reflectance of an antireflection layer 14 of Example 1 for light having a wavelength of 850 nm.

FIG. 10 shows incident angle dependence of the reflectance of the antireflection layer 14 of this Example for light having a wavelength of 850 nm. As shown in FIG. 10, the antireflection layer 14 of this Example realizes reflectance of lower than 2.5% for light (both of p-polarized light and s-polarized light) having a wavelength of 850 nm and an incident angle of 55° or less. Furthermore, the antireflection layer 14 of this Example realizes reflectance that is lower than 1.0% for p-polarized light having a wavelength 850 nm and an incident angle of 45° or less.

Figure 11A:
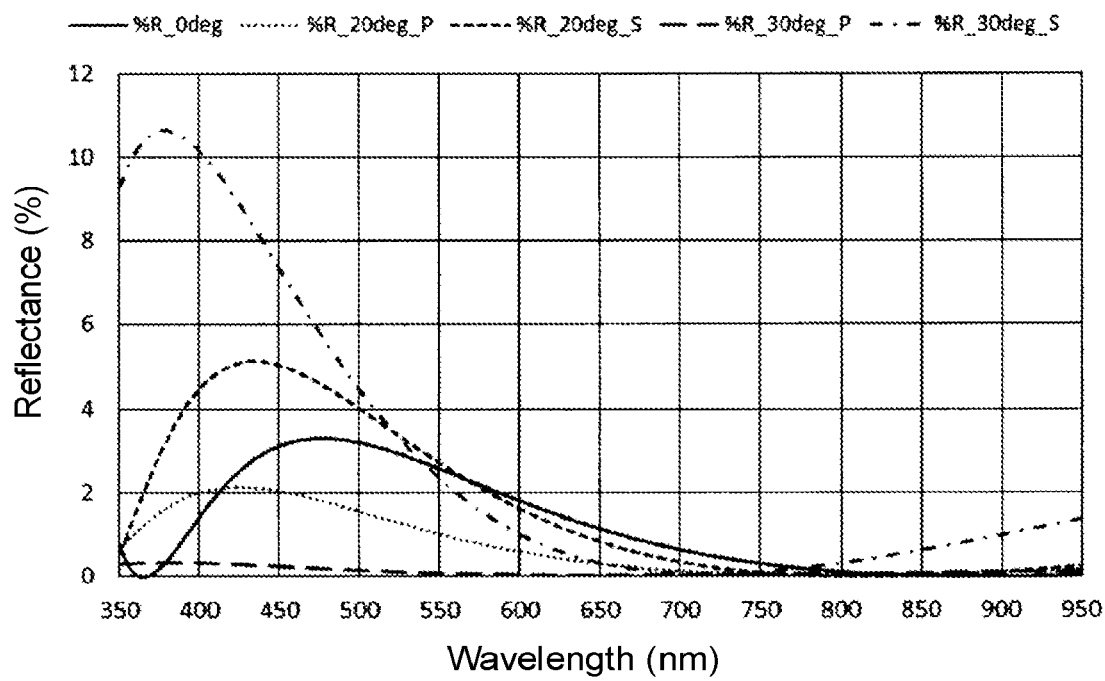
FIG. 11A and FIG. 11B are graphs showing calculation results of reflectance of an internal antireflection layer 13 of Example 1.
Figure 11B:
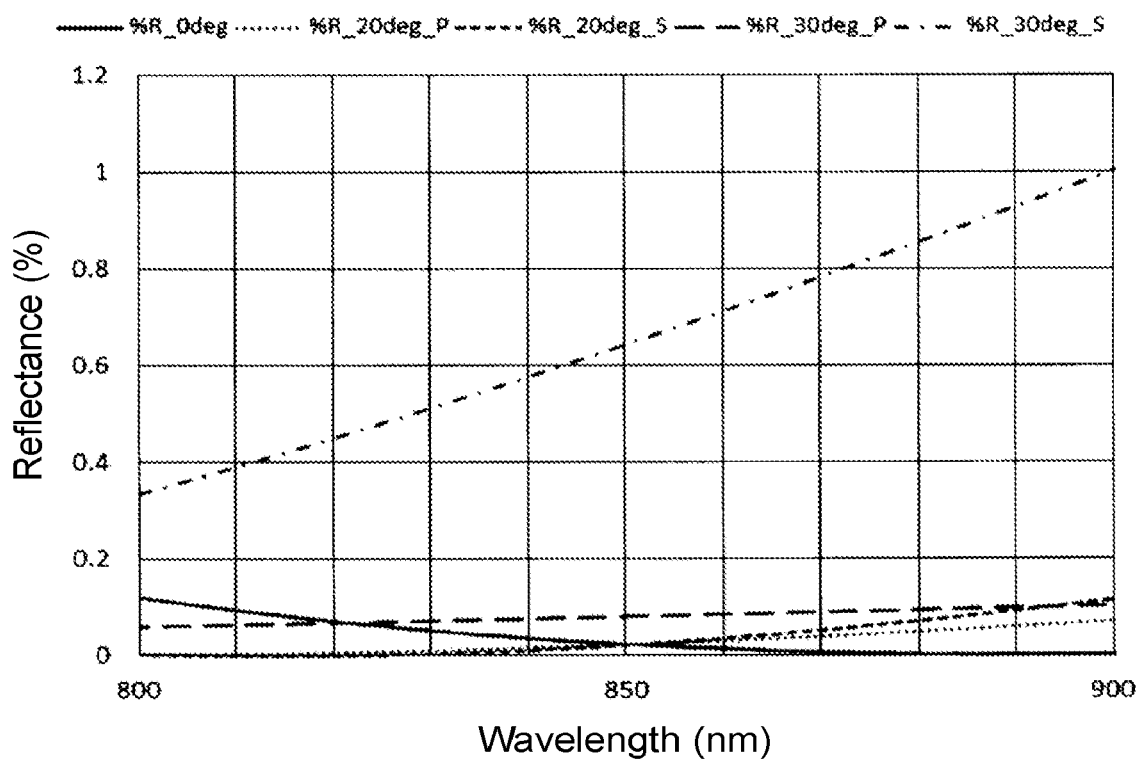

FIG. 11A and FIG. 11B show calculation results of reflectance of the internal antireflection layer 13 of this Example. FIG. 11A shows calculation results of reflectance in a wavelength range of 350 nm to 950 nm, and FIG. 11B shows calculation results of reflectance in part of the above wavelength range, that is, 800 nm to 900 nm. FIG. 11A and FIG. 11B show calculation results of cases where the incident angle, that is, the angle of incident light with respect to the normal direction of the substrate 11, is 0°, 20°, and 30°. In the case of oblique incidence, calculations were made for p-polarized light and s-polarized light.

Figure 12:
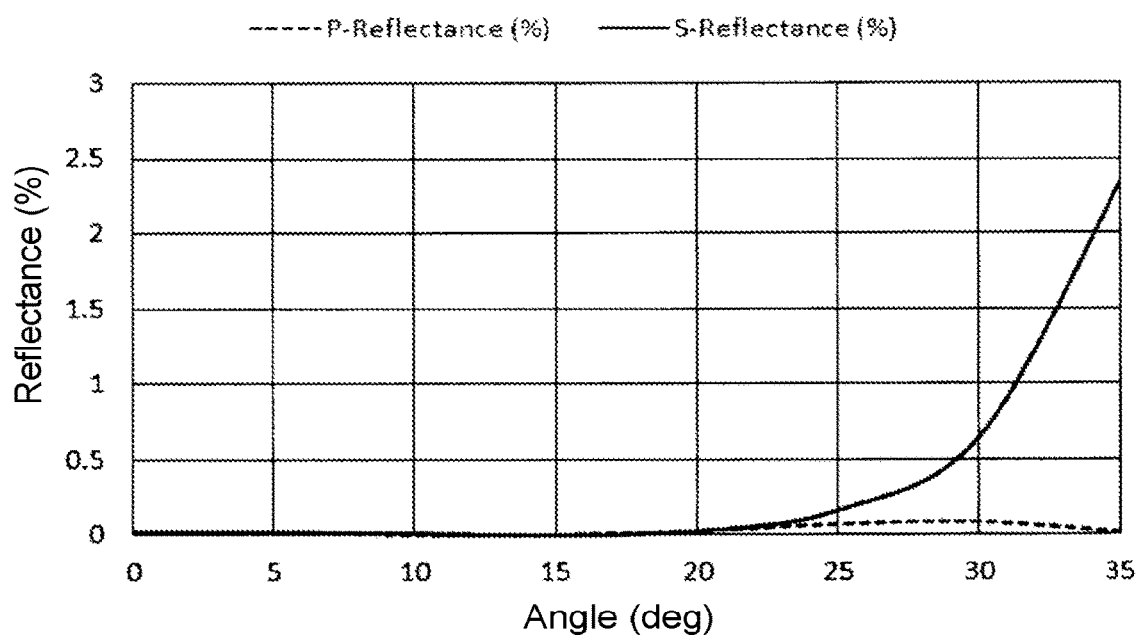
FIG. 12 is a graph showing incident angle dependence of the reflectance of the internal antireflection layer 13 of Example 1 for light having a wavelength of 850 nm.

FIG. 12 shows incident angle dependence of the reflectance of the internal antireflection layer 13 of this Example for light having a wavelength of 850 nm. As shown in FIG. 12, the internal antireflection layer 13 of this Example realizes reflectance of lower than 2.5% for light (both of p-polarized light and s-polarized light) having a wavelength of 850 nm and an incident angle of 35° or less. Furthermore, the antireflection layer 14 of this Example realizes reflectance of lower than 0.1% for p-polarized light having a wavelength of 850 nm and an incident angle of 35° or less. Although reflectance of the internal antireflection layer 13 and the antireflection layer 14 for incident angles of 35° or more are omitted, they can be calculated according to the above formula (4) using effective refractive indexes of the respective media corresponding to each incident angle.

Table 3 shows detailed data of optical characteristics of Examples 1A-1G. Table 3 shows fields of view (°) corresponding to exit angle ranges in the X direction, Y direction, and diagonal direction of exiting light, NAs, a grating depth (nm) of the protrusions 121, an effective refractive index of the materials of the protrusions 121, total efficiency (%), and 0th-order efficiency (%) of each Example.

TABLE 3

| | | Example 1 | | | | | | |
|---|---|---|---|---|---|---|---|---|
| | | A | B | C | D | E | F | G |
| FOV | X direction (°) | 34.9 | 47.2 | 60 | 66.7 | 73.7 | 81.1 | 88.9 |
| | Y direction (°) | 34.9 | 47.2 | 60 | 66.7 | 73.7 | 81.1 | 88.9 |
| | Diagonal (°) | 50.2 | 68.9 | 90 | 102.1 | 116.1 | 133.6 | 183.7 |
| NA x | | 0.30 | 0.40 | 0.50 | 0.55 | 0.60 | 0.65 | 0.70 |
| NA y | | 0.30 | 0.40 | 0.50 | 0.55 | 0.60 | 0.65 | 0.70 |
| NA | | 0.42 | 0.57 | 0.71 | 0.78 | 0.85 | 0.92 | 0.99 |
| Pitch x (μm) | | 28.33 | 21.25 | 17 | 15.45 | 14.17 | 13.08 | 12.14 |
| Pitch y (μm) | | 28.33 | 21.25 | 17 | 15.45 | 14.17 | 13.08 | 12.14 |
| Grating depth (nm) | | 494 | 500 | 500 | 500 | 507 | 507 | 507 |
| Effective refractive index of protrusions | | 1.976 | 1.979 | 1.979 | 1.979 | 1.982 | 1.982 | 1.982 |
| Total efficiency (%) | | 68.5 | 67 | 66.4 | 66.5 | 66.4 | 67 | 69 |
| 0th-order efficiency (%) | | 0.03 | 0.01 | 0.1 | 0.2 | 0.34 | 0.55 | 0.79 |

Figure 13:
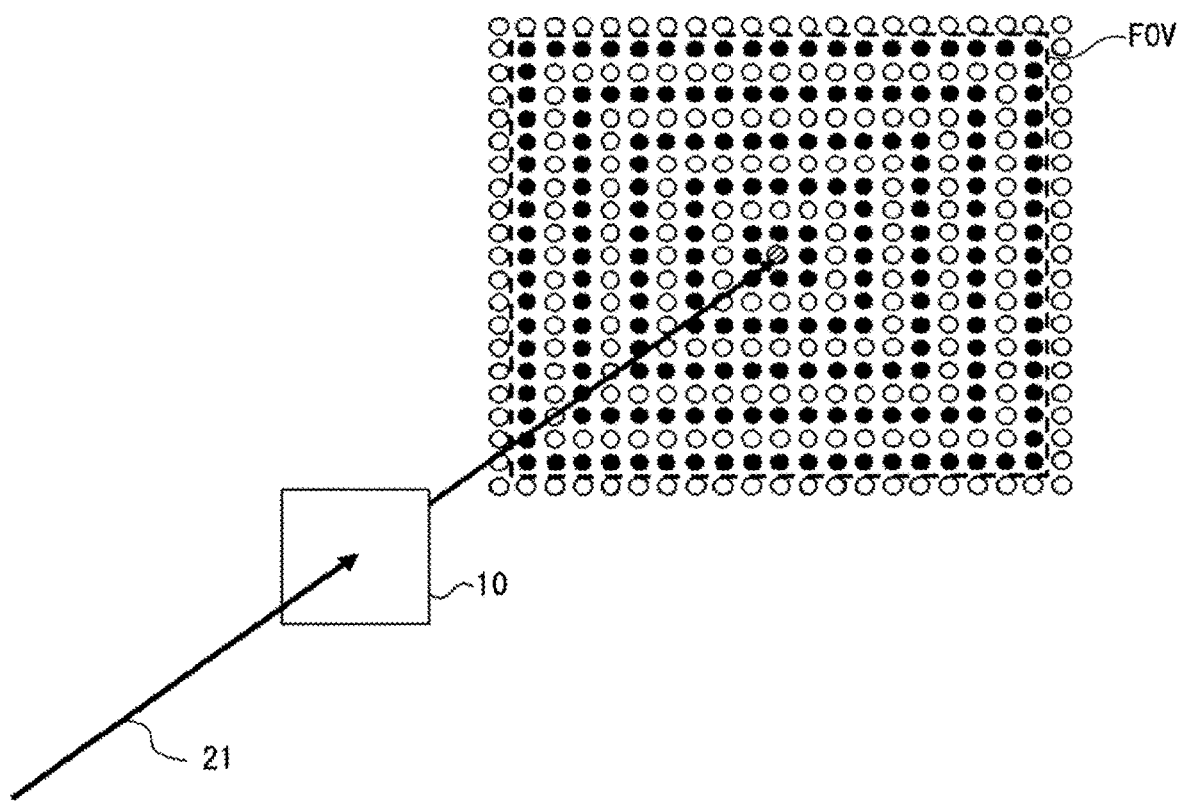
FIG. 13 is a schematic diagram for illustrating diffraction light that exits from the diffractive optical element 10.

Here, the total efficiency (%) is defined as the sum of diffraction efficiency of diffraction light beams of a design order. For example, the case where diffraction light beams shown in FIG. 13 exit is assumed. In the figure, black circles indicate diffraction light beams of a design order and white circles and a hatched circle indicate diffraction light beams of orders (non-design orders) which are not designed. The hatched circle indicates 0th-order light among the diffraction light beams of the non-design orders. In this case, the sum of diffraction efficiency of diffraction light beams indicated by the black circles in an FOV is employed as total efficiency without adding diffraction efficiency of the diffraction light beams indicated by the white circles although they are within the FOV. On the other hand, the 0th-order efficiency (0th-order light transmittance) means a ratio of a light quantity of transmission 0th-order light that is a straight transmission component of the incident light to a light quantity of incident light. The total efficiency and the 0th-order efficiency shown in Table 3 are values calculated by RCWA on the basis of the configurations shown in Table 2.

As shown in Table 3, total efficiency that is 65% or more (more specifically, 66% or more) and 0th-order efficiency that is lower than 1% (more specifically, lower than 0.40%) are realized.

Example 2

This Example is a diffractive optical element 10 having a protrusion and recess portion 12 having a multilayer structure that constitutes a two-step protrusion and recess pattern and does not include a base portion 123 like the example diffractive optical element 10 shown in FIG. 2A. However, also in this Example, an antireflection layer 14 is further provided on the surface of a substrate 11 opposite to its surface on which the protrusion and recess portion 12 is formed (see FIG. 8). More specifically, as shown in FIG. 2B and FIG. 2C, in this Example, portions of an internal antireflection layer 13 constitute a bottommost layer of the protrusions 121. However, these portions constituting parts of the protrusions 121 are 10 nm or less in thickness and hence are not regarded as parts of the protrusions 121 but as parts of the internal antireflection layer 13. The design wavelength is 850 nm and the recesses 122 are air (n=1).

Also in this Example, protrusion and recess patterns were designed so that the exit angle range $\theta_{out}$ (more specifically, diagonal viewing angle $\theta_d$) of a diffraction light group that exits from the protrusion and recess portion 12 became equal to 50°, 68°, 90°, 102°, 116°, 134°, and 164°, respectively. The Examples whose $\theta_d$ is 50°, 68°, 90°, 102°, 116°, 134°, and 164° are Examples 2A, 2B, 2C, 2D, 2E, 2F, and 2G, respectively. Example 2G is a Referential Example.

In this Example, the material of the protrusion and recess portion 12 was a four-layer multilayer film made of $Ta_2O_5$ having a refractive index of 2.192 and $SiO_2$ having a refractive index of 1.463. The material of the internal antireflection layer 13 was a single-layer dielectric film made of similar $SiO_2$. This Example is the same as Example 1 in the other respects. Table 4 shows specific configurations of Examples 2A to 2G of the diffractive optical element 10 of this Example. As shown in Table 4, in this Example, Examples 2A to 2G are the same in configuration except the structure of the protrusions 121.

TABLE 4

| | | | Thickness (nm) | | | | | | |
|---|---|---|---|---|---|---|---|---|---|
| | | Refractive | Example 2 | | | | | | |
| Configuration | Material(s) | index | A | B | C | D | E | F | G |
| Antireflection layer | $SiO_2$ | 1.463 | | | | 172 | | | |
| | $Ta_2O_5$ | 2.192 | | | | 67 | | | |
| | $SiO_2$ | 1.463 | | | | 42 | | | |
| | $Ta_2O_5$ | 2.192 | | | | 18 | | | |
| | $SiO_2$ | 1.463 | | | | 35 | | | |
| | $Ta_2O_5$ | 2.192 | | | | 18 | | | |

TABLE 4-continued

| | | Refractive | Thickness (nm) Example 2 | | | | | | |
|---|---|---|---|---|---|---|---|---|---|
| Configuration | Material(s) | index | A | B | C | D | E | F | G |
| Substrate | Borosilicate glass | 1.514 | | | | — | | | |
| Internal antireflection layer | SiO$_2$ | 1.463 | | | | 145 | | | |
| Protrusion Protrusions and recess portion | Ta$_2$O$_5$ | 2.192 | 35 | 35 | 35 | 35 | 35 | 35 | 35 |
| | SiO$_2$ | 1.463 | 49 | 49 | 49 | 49 | 49 | 49 | 49 |
| | Ta$_2$O$_5$ | 2.192 | 295 | 295 | 295 | 295 | 301 | 301 | 301 |
| | SiO$_2$ | 1.463 | 146 | 146 | 146 | 146 | 146 | 146 | 146 |

A manufacturing method of this Example is as follows. First, an antireflection layer 14 that is the same as in Example 1 is formed on a glass substrate. The material and thickness of each layer are as shown in Table 4.

Then an SiO$_2$ film to function as an internal antireflection layer 13 is formed at a thickness 145 nm on the surface of the glass substrate opposite to its surface on which the antireflection layer 14 has been formed. Then a four-layer dielectric multilayer film is formed at a predetermined film thickness using Ta$_2$O$_5$ and SiO$_2$ as materials of a protrusion and recess portion 12. The structure and the film thickness of each layer of the protrusion and recess portion 12 of each Example are as shown in Table 4.

Subsequently, the thus-formed four-layer multilayer film made of SiO$_2$ and Ta$_2$O$_5$ are processed into a two-step protrusion and recess structure by photolithography and etching. The heights (grating depths) of the protrusions 121 of the respective Examples are 525 nm to 531 nm (the sums of the thicknesses of the protrusion materials shown in Table 4). A height d (film thickness) of the protrusions 121 can be measured by observation of a cross section using a step gauge or an SEM. In this manner, diffractive optical elements 10 of Examples 2A-2G are obtained.

Table 5 shows detailed data of optical characteristics of Examples 2A-2G. Table 5 shows FOVs (°) corresponding to exit angle ranges in the X direction, Y direction, and diagonal direction of exiting light, NAs, a grating depth (nm) of the protrusions 121, an effective refractive index of the materials of the protrusions 121, total efficiency (%), and 0th-order efficiency (%) of each Example. The total efficiency and the 0th-order efficiency shown in Table 5 are values calculated by RCWA on the basis of the configurations shown in Table 4.

As shown in Table 5, total efficiency that is 70% or more and 0th-order efficiency that is lower than 1% (more specifically, lower than 0.40%) are realized.

Comparative Example 1

This Example is Comparative Examples for Example 1. These Comparative Examples are example diffractive optical elements that were designed using the same kinds of members (substrate 11, antireflection layer 14, and internal antireflection layer 13) as the respective example of diffractive optical elements 10 of Example 1 so as to have the same exit angle ranges as the respective example of diffractive optical elements 10 of Example 1 have. However, this Example is different from Example 1 in that the protrusions 121 is configured to be a single layer (more specifically, a single layer made of only Ta$_2$O$_5$ having a refractive index 2.192). That is, these Comparative Examples are different from Example 1 in that the low-refractive index material (SiO$_2$) that is employed in the protrusions 121 of Example 1 is not employed to constitute a topmost layer of the protrusions 121. Also in this Example, the design wavelength is 850 nm and the recesses 122 are air (n=1). This Example is the same as Example 1 in the other respects. Table 6 shows specific configurations of Comparative Examples 1A to 1G of the diffractive optical element of this Comparative Example. As shown in Table 6, in this Example, Comparative Examples 1A to 1G are the same in configuration except the structure of the protrusions 121.

TABLE 5

| | | Example 2 | | | | | | |
|---|---|---|---|---|---|---|---|---|
| | | A | B | C | D | E | F | G |
| FOV | X direction (°) | 34.9 | 47.2 | 60 | 66.7 | 73.7 | 81.1 | 88.9 |
| | Y direction (°) | 34.9 | 47.2 | 60 | 66.7 | 73.7 | 81.1 | 88.9 |
| | Diagonal (°) | 50.2 | 68.9 | 90 | 102.1 | 116.1 | 133.6 | 183.7 |
| NA x | | 0.30 | 0.40 | 0.50 | 0.55 | 0.60 | 0.65 | 0.70 |
| NA y | | 0.30 | 0.40 | 0.50 | 0.55 | 0.60 | 0.65 | 0.70 |
| NA | | 0.42 | 0.57 | 0.71 | 0.78 | 0.85 | 0.92 | 0.99 |
| Pitch x (μm) | | 28.33 | 21.25 | 17 | 15.45 | 14.17 | 13.08 | 12.14 |
| Pitch y (μm) | | 28.33 | 21.25 | 17 | 15.45 | 14.17 | 13.08 | 12.14 |
| Grating depth (nm) | | 525 | 525 | 525 | 525 | 531 | 531 | 531 |
| Effective refractive index of protrusions | | 1.921 | 1.921 | 1.921 | 1.921 | 1.924 | 1.924 | 1.924 |
| Total efficiency (%) | | 72.2 | 71.2 | 70.2 | 70.1 | 70 | 71.1 | 72.8 |
| 0th-order efficiency (%) | | 0.13 | 0.02 | 0.02 | 0.09 | 0.19 | 0.37 | 0.57 |

TABLE 6

| Configuration | | Material(s) | Refractive index | Thickness (nm) Comparative Example 1 | | | | | | |
|---|---|---|---|---|---|---|---|---|---|---|
| | | | | A | B | C | D | E | F | G |
| Antireflection layer | | SiO$_2$ | 1.463 | | | | 172 | | | |
| | | Ta$_2$O$_5$ | 2.192 | | | | 67 | | | |
| | | SiO$_2$ | 1.463 | | | | 42 | | | |
| | | Ta$_2$O$_5$ | 2.192 | | | | 18 | | | |
| | | SiO$_2$ | 1.463 | | | | 35 | | | |
| | | Ta$_2$O$_5$ | 2.192 | | | | 18 | | | |
| Substrate | | Borosilicate glass | 1.514 | | | | — | | | |
| Internal antireflection layer | | Ta$_2$O$_5$ | 2.192 | | | | 19 | | | |
| | | SiO$_2$ | 1.463 | | | | 34 | | | |
| | | Ta$_2$O$_5$ | 2.192 | | | | 25 | | | |
| | | SiO$_2$ | 1.463 | | | | 26 | | | |
| Protrusion and recess portion | Base portion | Ta$_2$O$_5$ | 2.192 | | | | 200 | | | |
| | Protrusions | | | 406 | 406 | 414 | 414 | 414 | 414 | 414 |

Table 7 shows detailed data of optical characteristics of Comparative Examples 1A-1G. Table 7 shows FOVs (°) corresponding to exit angle ranges in the X direction, Y direction, and diagonal direction of exiting light, NAs, a grating depth (nm) of the protrusions 121, an effective refractive index of the material of the protrusions 121, total efficiency (%), and 0th-order efficiency (%) of each Example. The total efficiency and the 0th-order efficiency shown in Table 7 are values calculated by RCWA on the basis of the configurations shown in Table 6.

TABLE 7

| | | Comparative Example 1 | | | | | | |
|---|---|---|---|---|---|---|---|---|
| | | A | B | C | D | E | F | G |
| FOV | X direction (°) | 34.9 | 47.2 | 60 | 66.7 | 73.7 | 81.1 | 88.9 |
| | Y direction (°) | 34.9 | 47.2 | 60 | 66.7 | 73.7 | 81.1 | 88.9 |
| | Diagonal (°) | 50.2 | 68.9 | 90 | 102.1 | 116.1 | 133.6 | 183.7 |
| NA x | | 0.30 | 0.40 | 0.50 | 0.55 | 0.60 | 0.65 | 0.70 |
| NA y | | 0.30 | 0.40 | 0.50 | 0.55 | 0.60 | 0.65 | 0.70 |
| NA | | 0.42 | 0.57 | 0.71 | 0.78 | 0.85 | 0.92 | 0.99 |
| Pitch x (μm) | | 28.33 | 21.25 | 17 | 15.45 | 14.17 | 13.08 | 12.14 |
| Pitch y (μm) | | 28.33 | 21.25 | 17 | 15.45 | 14.17 | 13.08 | 12.14 |
| Grating depth (nm) | | 406 | 406 | 414 | 414 | 414 | 414 | 414 |
| Effective refractive index of protrusions | | 2.192 | 2.192 | 2.192 | 2.192 | 2.192 | 2.192 | 2.192 |
| Total efficiency (%) | | 63.9 | 63.1 | 61.6 | 61.2 | 61.1 | 61.6 | 62.6 |
| 0th-order efficiency (%) | | 0.19 | 0.09 | 0.01 | 0.01 | 0.03 | 0.12 | 0.25 |

As shown in Table 7, in each Example the total efficiency is lower than 65% (more specifically, lower than 64%) although the 0th-order efficiency is as low as 1% or less (more specifically, 0.3% or less). It is understood that the diffraction efficiency is inferior to that in Example 1.

Figure 14:
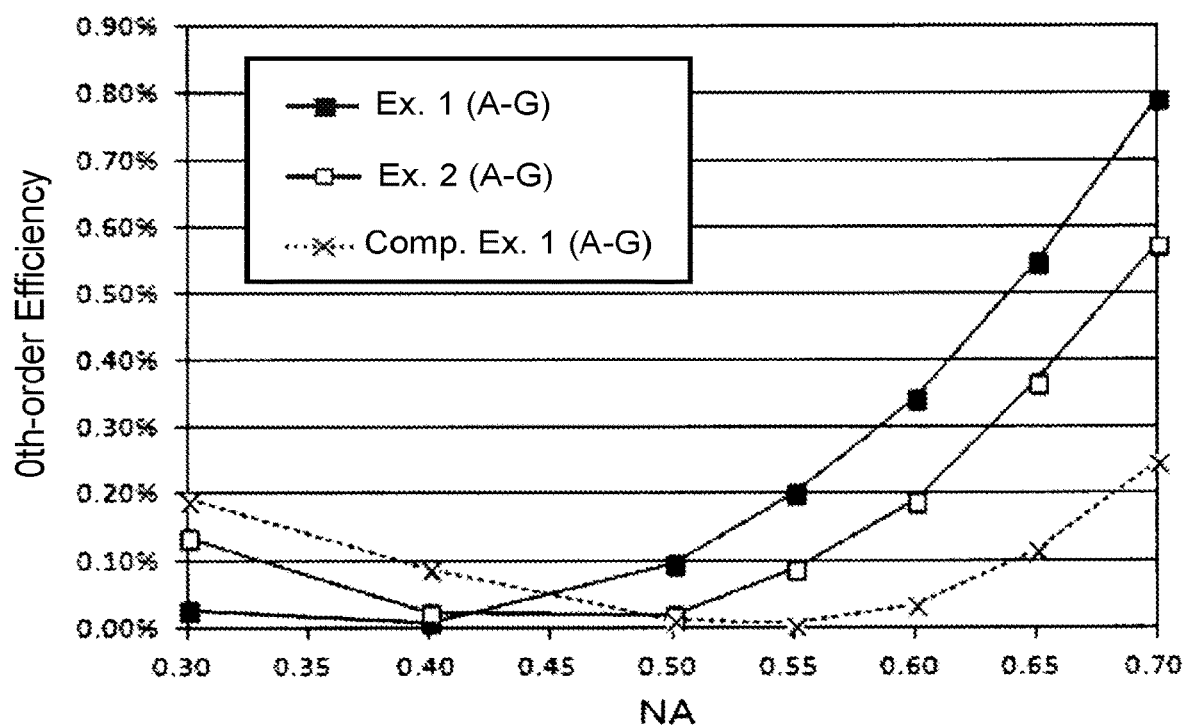
FIG. 14 is a graph showing calculation results of 0th-order efficiency of each of Example 1, Example 2, and Comparative Example 1.
Figure 15:
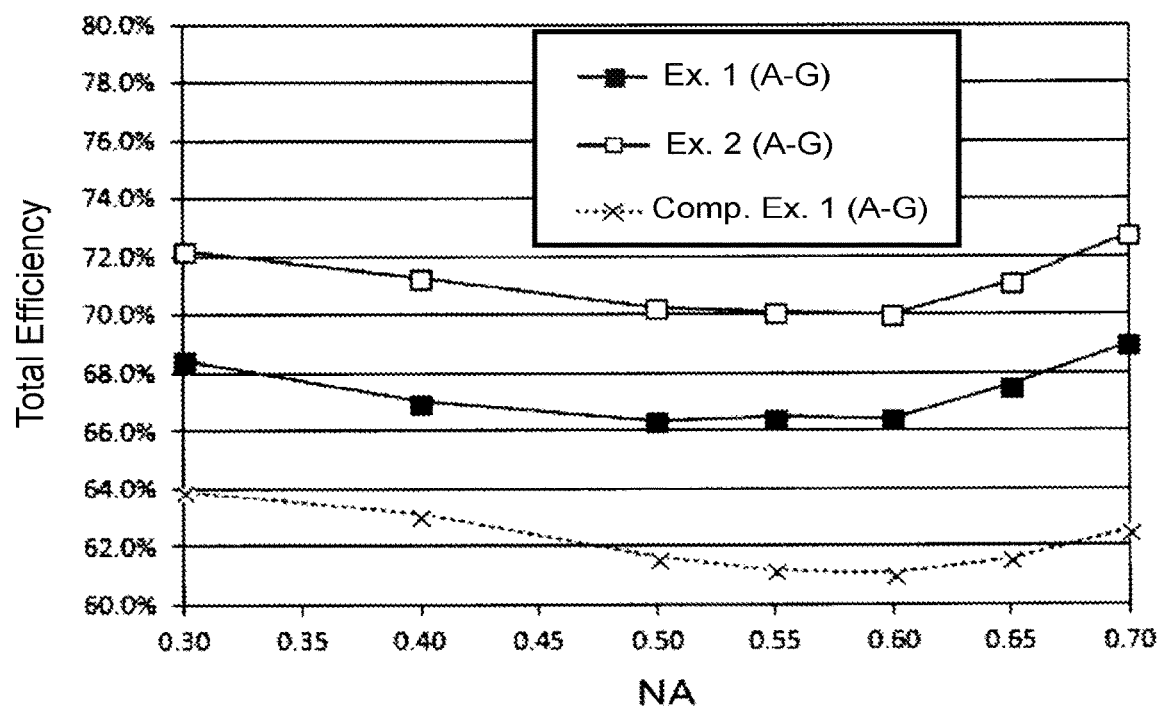
FIG. 15 is a graph showing calculation results of total efficiency of each of Example 1, Example 2, and Comparative Example 1.

The above-described 0th-order efficiency and total efficiency of the respective Examples are shown together in graphs of FIG. 14 and FIG. 15, respectively. FIG. 14 is a graph showing relationships between the NA and the 0th-order efficiency of each of Example 1, Example 2, and Comparative Example 1. FIG. 15 is a graph showing relationships between the NA and the total efficiency of each of Example 1, Example 2, and Comparative Example 1.

As shown in FIG. 14 and FIG. 15, the diffractive optical elements of Examples in which the exit angle range θ$_{out}$ is 50° or more (NA is 0.3 or more) can realize 0th-order efficiency at the design wavelength that is lower than 1.0% and total efficiency at the design wavelength that is 65% or more. Furthermore, the diffractive optical elements of Examples in which the exit angle range θ$_{out}$ is 50° or more and 130° or less (more specifically, NA is 0.3 to 0.65) can realize 0th-order efficiency at the design wavelength that is lower than 0.5% (more specifically, lower than 0.4%) and total efficiency at the design wavelength that is 65% or more.

The diffractive optical elements of Example 2 in which the protrusions 121 have a multilayer structure of four or more layers and the exit angle range θ$_{out}$ is 50° or more and 140° or less (more specifically, NA is 0.3 to 0.65) can realize 0th-order efficiency at the design wavelength that is lower than 0.5% (more specifically, lower than 0.4%) and total efficiency at the design wavelength that is 70% or more. Furthermore, the diffractive optical elements of Example 2 in which the exit angle range θ$_{out}$ is 50° or more and 130° or less (more specifically, NA is 0.3 to 0.60) can realize 0th-order efficiency at the design wavelength lower than 0.2% and total efficiency at the design wavelength that is 70% or more.

The above effects can be realized while the height of the protrusions 121 is prevented from becoming large as exemplified by the grating depth at the design wavelength of 850 nm being 600 nm or less (more specifically, 550 nm or less). Therefore, the invention can also contribute to thinning of optical elements.

INDUSTRIAL APPLICABILITY

The invention can be applied suitably to uses for widening the illumination range of a predetermined light pattern that is formed by a diffraction grating while reducing 0th-order light.

Although the invention has been described in detail with reference to the particular embodiments, it is apparent to those skilled in the art that various changes and modifications can be made without departing from the spirit and scope of the invention.

The present application is based on Japanese Patent Application No. 2018-110909 filed on Jun. 11, 2018, the disclosure of which is incorporated herein by reference.

REFERENCE SIGNS LIST

10: Diffractive optical element
11: Substrate
12: Protrusion and recess portion
121: Protrusions
122: Recesses
123: Base portion
13: Internal antireflection layer
14: Antireflection layer
21: Light beam
22: Diffraction light beam group
23: Light spot

The invention claimed is:

1. A diffractive optical element comprising:
a substrate;
a protrusion and recess portion that is formed on one surface of the substrate and imposes predetermined diffraction on incident light; and
an antireflection layer provided between the substrate and the protrusion and recess portion, wherein:
an effective refractive index difference Δn in a wavelength range of the incident light between a first medium constituting a protrusion of the protrusion and recess portion and a second medium constituting a recess of the protrusion and recess portion is 0.70 or more;
an exit angle range $\theta_{out}$ of diffraction light exiting from the protrusion and recess portion when the incident light enters the substrate from a normal direction of the substrate is 60° or more; and
total efficiency of diffraction light exiting from the protrusion and recess portion in the exit angle range with respect to a quantity of entire light entering the protrusion and recess portion in the wavelength range of the incident light is 65% or more.

2. The diffractive optical element according to claim 1, wherein:
the second medium is air; and
an effective refractive index of the first medium in the wavelength range of the incident light is 1.70 or more.

3. The diffractive optical element according to claim 1, wherein:
the first medium is a multilayer film comprising two or more layers made of two or more materials having different refractive indexes; and
a topmost layer of the protrusion is made of a low-refractive index material among the materials constituting the multilayer film.

4. The diffractive optical element according to claim 1, wherein the Δn and the $\theta_{out}$ satisfy a relationship of $\Delta n/\sin(\theta_{out}/2) \geq 1.0$.

5. The diffractive optical element according to claim 1, wherein 0th-order efficiency of the protrusion and recess portion in the wavelength range of the incident light is lower than 3.0%.

6. The diffractive optical element according to claim 5, wherein a ratio of a light quantity of 0th-order light to a quantity of entire light exiting from the protrusion and recess portion in the wavelength range of the incident light is lower than 1.0%.

7. The diffractive optical element according to claim 1, wherein:
the exit angle range is smaller than 140°;
0th-order efficiency of the protrusion and recess portion in the wavelength range of the incident light is 0.5% or lower; and
the total efficiency of the diffraction light exiting from the protrusion and recess portion in the exit angle range with respect to the quantity of the entire light entering the protrusion and recess portion in the wavelength range of the incident light is 70% or more.

8. The diffractive optical element according to claim 1, wherein the first medium is entirely made of an inorganic material.

9. The diffractive optical element according to claim 1, further comprising, at least between the recess and the antireflection layer, a base portion made of same material as a bottommost layer of the protrusion.

10. The diffractive optical element according to claim 1, wherein:
the antireflection layer is a dielectric multilayer film; and
reflectance of the antireflection layer for at least particular polarized light in the wavelength range of the incident light, exiting from the element at an angle being ¼ of the exit angle range with respect to a normal direction of the substrate, is 0.5% or less.

11. The diffractive optical element according to claim 1, wherein reflectance of the antireflection layer for at least particular polarized light in the wavelength range of the incident light, incident on the antireflection layer at 40° or less with respect to a normal direction of the substrate, is 0.5% or less.

12. The diffractive optical element according to claim 1, wherein:
the incident light is light in at least a part of a wavelength range of 700 nm to 1,200 nm; and
reflectance of the antireflection layer for at least particular polarized light in a wavelength range of 360 nm to 370 nm, incident on the antireflection layer at 20° or less with respect to a normal direction of the substrate, is 1.0% or less.

13. The diffractive optical element according to claim 1, further comprising a second antireflection layer on a surface of the substrate opposite to the surface on which the protrusion and recess portion is formed.

14. The diffractive optical element according to claim 13, wherein reflectance of the second antireflection layer for at least particular polarized light in the wavelength range of the incident light, exiting from the element at an angle being ¼ of the exit angle range with respect to a normal direction of the substrate, is 0.5% or less.

15. A projection device comprising:
a light source; and
the diffractive optical element according to claim 1,
wherein a ratio of a light quantity of light irradiating a predetermined projection surface to a light quantity of light emitted from the light source is 50% or more.

16. A measurement device comprising:
a projection unit configured to emit inspection light; and
a detection unit configured to detect scattering light generated as a result of irradiation of the inspection light emitted from the projection unit to a measurement target object,
wherein the projection device according to claim 15 is provided as the projection unit.

\* \* \* \* \*